(12) United States Patent
Heslin et al.

(10) Patent No.: US 7,888,629 B2
(45) Date of Patent: *Feb. 15, 2011

(54) VEHICULAR ACCESSORY MOUNTING SYSTEM WITH A FORWARDLY-VIEWING CAMERA

(75) Inventors: Patrick Heslin, Glasnevin (IE); Niall R. Lynam, Holland, MI (US)

(73) Assignee: Donnelly Corporation, Holland, MI (US)

(*) Notice: Subject to any disclaimer, the term of this patent is extended or adjusted under 35 U.S.C. 154(b) by 81 days.

This patent is subject to a terminal disclaimer.

(21) Appl. No.: 12/467,660

(22) Filed: May 18, 2009

(65) Prior Publication Data

US 2009/0219394 A1 Sep. 3, 2009

Related U.S. Application Data

(63) Continuation of application No. 12/197,660, filed on Aug. 25, 2008, now Pat. No. 7,538,316, which is a continuation of application No. 11/828,880, filed on Jul. 26, 2007, now Pat. No. 7,420,159, which is a continuation of application No. 11/699,271, filed on Jan. 29, 2007, now Pat. No. 7,265,342, which is a continuation of application No. 11/418,906, filed on May 5, 2006, now Pat. No. 7,262,406, which is a continuation of application No. 10/913,748, filed on Aug. 6, 2004, now Pat. No. 7,041,965, which is a continuation of application No. 10/618,334, filed on Jul. 11, 2003, now Pat. No. 6,774,356, which is a continuation of application No. 09/997,579, filed on Nov. 29, 2001, now Pat. No. 6,593,565, which is a continuation of application No. 09/433,467, filed on Nov. 4, 1999, now Pat. No. 6,326,613, which is a continuation-in-part of application No. 09/003,966, filed on Jan. 7, 1998, now Pat. No. 6,250,148.

(51) Int. Cl.
*H01J 5/02* (2006.01)

(52) U.S. Cl. .................................. 250/239; 250/208.1
(58) Field of Classification Search ................. 250/239, 250/208.1, 216, 227.25; 359/229, 230, 242; 340/461, 485, 602
See application file for complete search history.

(56) References Cited

U.S. PATENT DOCUMENTS 1,096,452 A   5/1914   Perrin
(Continued)

FOREIGN PATENT DOCUMENTS

AU   A-40317/95   2/1995
(Continued)

OTHER PUBLICATIONS

Steward, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.
(Continued)

*Primary Examiner*—Que T Le
(74) *Attorney, Agent, or Firm*—Van Dyke, Gardner, Linn & Burkhart, LLP

(57) ABSTRACT

An accessory mounting system includes an assembly adapted for mounting or attachment at a portion of the windshield of a vehicle. A light absorbing layer at the portion of the windshield of the vehicle at least partially hides the assembly from view by a viewer external the vehicle when the viewer is viewing through the windshield with the assembly at the portion of the windshield. The light absorbing layer includes a light transmitting portion, and a forwardly-viewing camera disposed at the assembly views through the light transmitting portion of the light absorbing layer at the portion of the windshield of the vehicle when the assembly is at the portion of the windshield. The assembly may comprise a pivot element for connecting to an interior mirror or the assembly may comprise a mirror assembly mount button received by a mirror mount of a single-pivot or double-pivot interior rearview mirror assembly.

61 Claims, 5 Drawing Sheets

U.S. PATENT DOCUMENTS

| | | |
|---|---|---|
| 1,563,258 A | 11/1925 | Cunningham |
| 2,166,303 A | 7/1939 | Hodny et al. |
| 2,414,223 A | 1/1947 | DeVirgilis |
| 2,457,348 A | 12/1948 | Chambers |
| 2,561,582 A | 7/1951 | Marbel |
| 3,141,393 A | 7/1964 | Platt |
| 3,162,008 A | 12/1964 | Berger et al. |
| 3,185,020 A | 5/1965 | Thelen |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein et al. |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,860,847 A | 1/1975 | Carley |
| 3,862,798 A | 1/1975 | Hopkins |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |

| | | | | | |
|---|---|---|---|---|---|
| 4,807,096 A | 2/1989 | Skogler et al. | 5,136,483 A | 8/1992 | Schöniger et al. |
| 4,820,933 A | 4/1989 | Hong et al. | 5,140,455 A | 8/1992 | Varaprasad et al. |
| 4,825,232 A | 4/1989 | Howdle | 5,142,407 A | 8/1992 | Varaprasad et al. |
| 4,827,086 A | 5/1989 | Rockwell | 5,145,609 A | 9/1992 | Varaprasad et al. |
| 4,837,551 A | 6/1989 | Iino | 5,150,232 A | 9/1992 | Gunkima et al. |
| 4,845,402 A | 7/1989 | Smith | 5,151,816 A | 9/1992 | Varaprasad et al. |
| 4,847,772 A | 7/1989 | Michalopoulos et al. | 5,151,824 A | 9/1992 | O'Farrell |
| 4,855,161 A | 8/1989 | Moser et al. | 5,154,617 A | 10/1992 | Suman et al. |
| 4,855,550 A | 8/1989 | Schultz, Jr. | 5,158,638 A | 10/1992 | Osanami et al. |
| 4,859,813 A | 8/1989 | Rockwell | 5,160,200 A | 11/1992 | Cheselske |
| 4,859,867 A | 8/1989 | Larson et al. ............. 307/10.1 | 5,160,201 A | 11/1992 | Wrobel |
| 4,862,594 A | 9/1989 | Schierbeek et al. | 5,168,378 A | 12/1992 | Black et al. |
| 4,871,917 A | 10/1989 | O'Farrell et al. ............ 250/341 | 5,173,881 A | 12/1992 | Sindle |
| 4,872,051 A | 10/1989 | Dye | 5,177,031 A | 1/1993 | Buchmann et al. |
| 4,882,565 A | 11/1989 | Gallmeyer | 5,178,448 A | 1/1993 | Adams et al. |
| 4,883,349 A | 11/1989 | Mittelhäuser | 5,179,471 A | 1/1993 | Caskey et al. |
| 4,884,135 A | 11/1989 | Schiffman | 5,184,956 A | 2/1993 | Langlarais et al. |
| 4,886,960 A | 12/1989 | Molyneux et al. | 5,189,537 A | 2/1993 | O'Farrell |
| 4,891,828 A | 1/1990 | Kawazoe | 5,193,029 A | 3/1993 | Schofield et al. |
| 4,892,345 A | 1/1990 | Rachael, III | 5,197,562 A | 3/1993 | Kakinami et al. |
| 4,902,103 A | 2/1990 | Miyake et al. | 5,207,492 A | 5/1993 | Roberts |
| 4,902,108 A | 2/1990 | Byker | 5,210,967 A | 5/1993 | Brown |
| 4,910,591 A | 3/1990 | Petrossian et al. | 5,214,408 A | 5/1993 | Asayama |
| 4,916,374 A | 4/1990 | Schierbeek et al. ......... 318/483 | 5,217,794 A | 6/1993 | Schrenk |
| 4,926,170 A | 5/1990 | Beggs et al. | 5,223,814 A | 6/1993 | Suman |
| 4,930,742 A | 6/1990 | Schofield et al. ......... 248/475.1 | 5,223,844 A | 6/1993 | Mansell et al. |
| 4,935,665 A | 6/1990 | Murata | 5,229,975 A | 7/1993 | Truesdell et al. |
| 4,936,533 A | 6/1990 | Adams et al. ............ 248/222.1 | 5,230,400 A | 7/1993 | Kakinama et al. |
| 4,937,796 A | 6/1990 | Tendler | 5,233,461 A | 8/1993 | Dornan et al. |
| 4,937,945 A | 7/1990 | Schofield et al. | 5,235,316 A | 8/1993 | Qualizza |
| 4,943,796 A | 7/1990 | Lee | 5,239,405 A | 8/1993 | Varaprasad et al. |
| 4,948,242 A | 8/1990 | Desmond et al. | 5,239,406 A | 8/1993 | Lynam |
| 4,953,305 A | 9/1990 | Van Lente et al. | 5,243,417 A | 9/1993 | Pollard |
| 4,956,591 A | 9/1990 | Schierbeek et al. ......... 318/483 | 5,245,422 A | 9/1993 | Borcherts et al. |
| 4,959,247 A | 9/1990 | Moser et al. | 5,252,354 A | 10/1993 | Cronin et al. |
| 4,959,865 A | 9/1990 | Stettiner et al. | 5,253,109 A | 10/1993 | O'Farrell et al. |
| 4,970,653 A | 11/1990 | Kenue | 5,255,442 A | 10/1993 | Schierbeek et al. |
| 4,973,844 A | 11/1990 | O'Farrell et al. ............ 250/341 | 5,260,626 A | 11/1993 | Takase et al. |
| 4,978,196 A | 12/1990 | Suzuki et al. | 5,277,986 A | 1/1994 | Cronin et al. |
| 4,983,951 A | 1/1991 | Igarashi et al. | 5,280,555 A | 1/1994 | Ainsburg |
| 4,987,357 A | 1/1991 | Masaki | 5,285,060 A | 2/1994 | Larson et al. |
| 4,996,083 A | 2/1991 | Moser et al. | 5,289,321 A | 2/1994 | Secor |
| 5,001,386 A | 3/1991 | Sullivan et al. | 5,296,924 A | 3/1994 | de Saint Blancard et al. |
| 5,001,558 A | 3/1991 | Burley et al. | 5,303,205 A | 4/1994 | Gauthier et al. |
| 5,005,213 A | 4/1991 | Hanson et al. | 5,304,980 A | 4/1994 | Maekawa |
| 5,006,971 A | 4/1991 | Jerkins | 5,305,012 A | 4/1994 | Faris |
| 5,014,167 A | 5/1991 | Roberts | 5,307,136 A | 4/1994 | Saneyoshi |
| 5,016,996 A | 5/1991 | Ueno | 5,313,335 A | 5/1994 | Gray et al. |
| 5,017,903 A | 5/1991 | Krippelz, Sr. | 5,325,096 A | 6/1994 | Pakett |
| 5,027,200 A | 6/1991 | Petrossian et al. | 5,325,386 A | 6/1994 | Jewell et al. |
| 5,037,182 A | 8/1991 | Groves et al. | 5,327,288 A | 7/1994 | Wellington et al. |
| 5,038,255 A | 8/1991 | Nishihashi et al. | 5,330,149 A | 7/1994 | Haan et al. |
| 5,056,899 A | 10/1991 | Warszawski | 5,331,312 A | 7/1994 | Kudoh |
| 5,058,851 A | 10/1991 | Lawlor et al. ............... 248/549 | 5,331,358 A | 7/1994 | Schurle et al. |
| 5,059,015 A | 10/1991 | Tran | 5,339,075 A | 8/1994 | Abst et al. |
| 5,066,108 A | 11/1991 | McDonald | 5,339,529 A | 8/1994 | Lindberg |
| 5,066,112 A | 11/1991 | Lynam et al. | 5,341,437 A | 8/1994 | Nakayama |
| 5,070,323 A | 12/1991 | Iino et al. | D351,370 S | 10/1994 | Lawlor et al. |
| 5,073,012 A | 12/1991 | Lynam | 5,355,118 A | 10/1994 | Fukuhara |
| 5,076,673 A | 12/1991 | Lynam et al. | 5,355,284 A | 10/1994 | Roberts |
| 5,076,674 A | 12/1991 | Lynam | 5,361,190 A | 11/1994 | Roberts et al. |
| 5,096,287 A | 3/1992 | Kakinami et al. | 5,371,659 A | 12/1994 | Pastrick et al. |
| 5,100,095 A | 3/1992 | Haan et al. .................. 248/549 | 5,373,482 A | 12/1994 | Gauthier |
| 5,101,139 A | 3/1992 | Lechter | 5,386,285 A | 1/1995 | Asayama |
| 5,105,127 A | 4/1992 | Lavaud et al. | 5,386,306 A | 1/1995 | Gunjima et al. |
| 5,115,346 A | 5/1992 | Lynam | 5,400,158 A | 3/1995 | Ohnishi et al. |
| 5,117,346 A | 5/1992 | Gard | 5,402,103 A | 3/1995 | Tashiro |
| 5,121,200 A | 6/1992 | Choi | 5,406,395 A | 4/1995 | Wilson et al. |
| 5,122,619 A | 6/1992 | Dlubak | 5,406,414 A | 4/1995 | O'Farrell et al. |
| 5,124,845 A | 6/1992 | Shimojo | 5,408,353 A | 4/1995 | Nichols et al. |
| 5,128,799 A | 7/1992 | Byker | 5,408,357 A | 4/1995 | Beukema |
| 5,131,154 A | 7/1992 | Schierbeek et al. | 5,410,346 A | 4/1995 | Saneyoshi et al. |
| 5,135,298 A | 8/1992 | Feltman | 5,414,439 A | 5/1995 | Groves et al. |

| | | | | | | |
|---|---|---|---|---|---|---|
| 5,414,461 A | 5/1995 | Kishi et al. | | 5,617,085 A | 4/1997 | Tsutsumi et al. |
| 5,416,313 A | 5/1995 | Larson et al. | | 5,619,374 A | 4/1997 | Roberts |
| 5,416,478 A | 5/1995 | Morinaga | | 5,619,375 A | 4/1997 | Roberts |
| 5,418,610 A | 5/1995 | Fischer | | 5,626,800 A | 5/1997 | Williams et al. |
| 5,422,756 A | 6/1995 | Weber | | 5,631,089 A | 5/1997 | Center, Jr. et al. |
| 5,424,726 A | 6/1995 | Beymer | | 5,631,638 A | 5/1997 | Kaspar et al. |
| 5,424,865 A | 6/1995 | Lynam | | 5,631,639 A | 5/1997 | Hibino et al. |
| 5,424,952 A | 6/1995 | Asayama | | 5,632,092 A | 5/1997 | Blank et al. |
| 5,430,431 A | 7/1995 | Nelson | | 5,632,551 A | 5/1997 | Roney et al. |
| 5,432,496 A | 7/1995 | Lin | | 5,634,709 A | 6/1997 | Iwama |
| 5,432,626 A | 7/1995 | Sasuga et al. | | 5,640,216 A | 6/1997 | Hasegawa et al. |
| 5,436,741 A | 7/1995 | Crandall | | 5,642,238 A | 6/1997 | Sala |
| 5,439,305 A | 8/1995 | Santo ............... 403/76 | | 5,644,851 A | 7/1997 | Blank et al. |
| 5,444,478 A | 8/1995 | Lelong et al. | | 5,646,614 A | 7/1997 | Abersfelder et al. |
| 5,446,576 A | 8/1995 | Lynam et al. | | 5,649,756 A | 7/1997 | Adams et al. |
| 5,455,716 A | 10/1995 | Suman et al. | | 5,649,758 A | 7/1997 | Dion |
| 5,461,361 A | 10/1995 | Moore | | 5,650,765 A | 7/1997 | Park |
| D363,920 S | 11/1995 | Roberts et al. | | 5,650,929 A | 7/1997 | Potter et al. |
| 5,469,298 A | 11/1995 | Suman et al. | | 5,661,455 A | 8/1997 | Van Lente et al. |
| 5,475,366 A | 12/1995 | Van Lente et al. ........ 340/525 | | 5,661,651 A | 8/1997 | Geschke et al. |
| 5,475,494 A | 12/1995 | Nishida et al. | | 5,661,804 A | 8/1997 | Dykema et al. |
| 5,481,409 A | 1/1996 | Roberts | | 5,662,375 A | 9/1997 | Adams et al. |
| 5,483,453 A | 1/1996 | Uemura et al. | | 5,666,157 A | 9/1997 | Aviv |
| 5,485,161 A | 1/1996 | Vaughn | | 5,668,663 A | 9/1997 | Varaprasad et al. |
| 5,485,378 A | 1/1996 | Franke et al. | | 5,668,675 A | 9/1997 | Fredricks |
| 5,487,522 A | 1/1996 | Hook ............... 248/549 | | 5,669,698 A | 9/1997 | Veldman et al. |
| 5,488,496 A | 1/1996 | Pine | | 5,669,699 A | 9/1997 | Pastrick et al. |
| 5,497,305 A | 3/1996 | Pastrick et al. | | 5,669,704 A | 9/1997 | Pastrick |
| 5,497,306 A | 3/1996 | Pastrick | | 5,669,705 A | 9/1997 | Pastrick et al. |
| 5,500,760 A | 3/1996 | Varaprasad et al. | | 5,670,935 A | 9/1997 | Schofield et al. |
| 5,510,983 A | 4/1996 | Iino | | 5,671,996 A | 9/1997 | Bos et al. |
| 5,515,448 A | 5/1996 | Nishitani | | 5,673,994 A | 10/1997 | Fant, Jr. et al. |
| 5,519,621 A | 5/1996 | Wortham | | 5,673,999 A | 10/1997 | Koenck |
| 5,521,744 A | 5/1996 | Mazurek | | 5,677,598 A | 10/1997 | De Hair et al. |
| 5,521,760 A | 5/1996 | DeYoung et al. | | 5,680,123 A | 10/1997 | Lee |
| 5,523,811 A | 6/1996 | Wada et al. | | 5,680,245 A | 10/1997 | Lynam |
| 5,525,264 A | 6/1996 | Cronin et al. | | 5,680,263 A | 10/1997 | Zimmermann et al. |
| 5,525,977 A | 6/1996 | Suman | | 5,686,975 A | 11/1997 | Lipton |
| 5,528,422 A | 6/1996 | Roberts | | 5,686,979 A | 11/1997 | Weber et al. |
| 5,528,474 A | 6/1996 | Roney et al. | | 5,689,241 A | 11/1997 | Clarke, Sr. et al. |
| 5,529,138 A | 6/1996 | Shaw et al. | | 5,691,848 A | 11/1997 | Van Lente et al. |
| 5,530,240 A | 6/1996 | Larson et al. | | 5,692,819 A | 12/1997 | Mitsutake et al. |
| 5,530,420 A | 6/1996 | Tsuchiya et al. | | 5,699,044 A | 12/1997 | Van Lente et al. |
| 5,530,421 A | 6/1996 | Marshall et al. | | 5,699,188 A | 12/1997 | Gilbert et al. |
| 5,535,056 A | 7/1996 | Caskey et al. | | 5,708,410 A | 1/1998 | Blank et al. ............ 340/438 |
| 5,535,144 A | 7/1996 | Kise | | 5,708,415 A | 1/1998 | Van Lente et al. |
| 5,539,397 A | 7/1996 | Asanuma et al. | | 5,708,857 A | 1/1998 | Ishibashi |
| 5,541,590 A | 7/1996 | Nishio | | 5,715,093 A | 2/1998 | Schierbeek et al. |
| 5,550,677 A | 8/1996 | Schofield et al. | | 5,724,187 A | 3/1998 | Varaprasad et al. |
| 5,555,172 A | 9/1996 | Potter | | 5,724,316 A | 3/1998 | Brunts |
| 5,561,333 A | 10/1996 | Darius | | 5,729,194 A | 3/1998 | Spears et al. |
| 5,567,360 A | 10/1996 | Varaprasad et al. | | 5,737,226 A | 4/1998 | Olson et al. |
| 5,568,316 A | 10/1996 | Schrenk et al. | | 5,741,966 A | 4/1998 | Handfield et al. |
| 5,570,127 A | 10/1996 | Schmidt | | 5,744,227 A | 4/1998 | Bright et al. |
| 5,572,354 A | 11/1996 | Desmond et al. ........ 359/265 | | 5,745,050 A | 4/1998 | Nakagawa |
| 5,574,426 A | 11/1996 | Shisgal et al. | | 5,745,266 A | 4/1998 | Smith |
| 5,574,443 A | 11/1996 | Hsieh | | 5,748,172 A | 5/1998 | Song et al. |
| 5,576,687 A | 11/1996 | Blank et al. ............ 340/438 | | 5,748,287 A | 5/1998 | Takahashi et al. |
| 5,576,854 A | 11/1996 | Schmidt et al. | | 5,751,211 A | 5/1998 | Shirai et al. |
| 5,576,975 A | 11/1996 | Sasaki et al. | | 5,751,246 A | 5/1998 | Hertel |
| 5,578,404 A | 11/1996 | Kliem | | 5,751,390 A | 5/1998 | Crawford et al. |
| 5,587,236 A | 12/1996 | Agrawal et al. | | 5,751,489 A | 5/1998 | Caskey et al. |
| 5,587,699 A | 12/1996 | Faloon et al. | | 5,754,099 A | 5/1998 | Nishimura et al. |
| 5,594,615 A | 1/1997 | Spijkerman et al. | | D394,833 S | 6/1998 | Muth |
| 5,602,542 A | 2/1997 | Widmann et al. | | 5,760,828 A | 6/1998 | Cortes |
| 5,602,670 A | 2/1997 | Keegan | | 5,760,931 A | 6/1998 | Saburi et al. |
| 5,608,550 A | 3/1997 | Epstein et al. | | 5,760,962 A | 6/1998 | Schofield et al. |
| 5,610,380 A | 3/1997 | Nicolaisen | | 5,761,094 A | 6/1998 | Olson et al. |
| 5,610,756 A | 3/1997 | Lynam et al. | | 5,762,823 A | 6/1998 | Hikmet |
| 5,611,966 A | 3/1997 | Varaprasad et al. | | 5,764,139 A | 6/1998 | Nojima et al. |
| 5,614,885 A | 3/1997 | Van Lente et al. | | 5,765,940 A | 6/1998 | Levy et al. |
| 5,615,023 A | 3/1997 | Yang | | 5,767,793 A | 6/1998 | Agravante et al. |
| 5,615,857 A | 4/1997 | Hook ............... 248/549 | | 5,768,020 A | 6/1998 | Nagao |

| | | | | | |
|---|---|---|---|---|---|
| 5,775,762 A | 7/1998 | Vitito | 5,949,331 A | 9/1999 | Schofield et al. |
| 5,777,779 A | 7/1998 | Hashimoto et al. | 5,956,079 A | 9/1999 | Ridgley |
| 5,780,160 A | 7/1998 | Allemand et al. | 5,956,181 A | 9/1999 | Lin |
| 5,786,772 A | 7/1998 | Schofield et al. | 5,959,367 A | 9/1999 | O'Farrell et al. |
| 5,788,357 A | 8/1998 | Muth et al. | 5,959,555 A | 9/1999 | Furuta |
| 5,790,973 A | 8/1998 | Blaker et al. | 5,959,577 A | 9/1999 | Fan et al. |
| 5,793,308 A | 8/1998 | Rosinski et al. | 5,963,247 A | 10/1999 | Banitt |
| 5,793,420 A | 8/1998 | Schmidt | 5,965,247 A | 10/1999 | Jonza et al. |
| 5,796,094 A | 8/1998 | Schofield et al. ......... 250/208.1 | 5,968,538 A | 10/1999 | Snyder, Jr. |
| 5,796,176 A | 8/1998 | Kramer et al. | 5,971,552 A | 10/1999 | O'Farrell et al. |
| 5,798,057 A | 8/1998 | Hikmet | 5,973,760 A | 10/1999 | Dehmlow |
| 5,798,575 A | 8/1998 | O'Farrell et al. | 5,975,715 A | 11/1999 | Bauder |
| 5,798,688 A | 8/1998 | Schofield | 5,984,482 A | 11/1999 | Rumsey et al. |
| 5,800,918 A | 9/1998 | Chartier et al. | 5,986,730 A | 11/1999 | Hansen et al. |
| 5,802,727 A | 9/1998 | Blank et al. | 5,987,381 A | 11/1999 | Oshizawa |
| 5,803,579 A | 9/1998 | Turnbull et al. | 5,990,469 A | 11/1999 | Bechtel et al. |
| 5,805,330 A | 9/1998 | Byker et al. | 5,990,625 A | 11/1999 | Meissner et al. |
| 5,805,367 A | 9/1998 | Kanazawa | 5,995,180 A | 11/1999 | Moriwaki et al. |
| 5,806,879 A | 9/1998 | Hamada et al. | 5,998,617 A | 12/1999 | Srinivasa et al. |
| 5,806,965 A | 9/1998 | Deese | 5,998,929 A | 12/1999 | Bechtel et al. |
| 5,808,197 A | 9/1998 | Dao | 6,000,823 A | 12/1999 | Desmond et al. |
| 5,808,566 A | 9/1998 | Behr et al. | 6,001,486 A | 12/1999 | Varaprasad et al. |
| 5,808,589 A | 9/1998 | Fergason | 6,002,511 A | 12/1999 | Varaprasad et al. |
| 5,808,713 A | 9/1998 | Broer et al. | 6,002,544 A | 12/1999 | Yatsu |
| 5,808,777 A | 9/1998 | Lynam et al. | 6,005,724 A | 12/1999 | Todd |
| 5,808,778 A | 9/1998 | Bauer et al. | 6,007,222 A | 12/1999 | Thau |
| 5,813,745 A | 9/1998 | Fant, Jr. et al. | 6,008,486 A | 12/1999 | Stam et al. |
| 5,818,625 A | 10/1998 | Forgette et al. | 6,008,871 A | 12/1999 | Okumura |
| 5,820,097 A | 10/1998 | Spooner ................... 248/549 | 6,009,359 A | 12/1999 | El-Hakim et al. |
| 5,820,245 A | 10/1998 | Desmond et al. | 6,016,035 A | 1/2000 | Eberspächer et al. |
| 5,822,023 A | 10/1998 | Suman et al. | 6,016,215 A | 1/2000 | Byker |
| 5,823,654 A | 10/1998 | Pastrick et al. | 6,019,411 A | 2/2000 | Carter et al. |
| 5,825,527 A | 10/1998 | Forgette et al. | 6,019,475 A | 2/2000 | Lynam et al. |
| 5,835,166 A | 11/1998 | Hall et al. | 6,021,371 A | 2/2000 | Fultz |
| 5,837,994 A | 11/1998 | Stam et al. | 6,023,229 A | 2/2000 | Bugno et al. |
| 5,844,505 A | 12/1998 | Van Ryzin | 6,025,872 A | 2/2000 | Ozaki et al. |
| 5,848,373 A | 12/1998 | DeLorme et al. | 6,028,537 A | 2/2000 | Suman et al. |
| 5,850,176 A | 12/1998 | Kinoshita et al. | 6,037,689 A | 3/2000 | Bingle et al. |
| 5,850,205 A | 12/1998 | Blouin | 6,040,939 A | 3/2000 | Demiryont et al. |
| 5,863,116 A | 1/1999 | Pastrick et al. | 6,042,253 A | 3/2000 | Fant, Jr. et al. |
| 5,864,419 A | 1/1999 | Lynam | 6,042,934 A | 3/2000 | Guiselin et al. |
| 5,867,801 A | 2/1999 | Denny | 6,045,243 A | 4/2000 | Muth et al. |
| 5,871,275 A | 2/1999 | O'Farrell et al. | 6,045,643 A | 4/2000 | Byker et al. |
| 5,871,843 A | 2/1999 | Yoneda et al. | 6,046,766 A | 4/2000 | Sakata |
| 5,877,707 A | 3/1999 | Kowalick | 6,046,837 A | 4/2000 | Yamamoto |
| 5,877,897 A | 3/1999 | Schofield et al. | 6,049,171 A | 4/2000 | Stam et al. |
| 5,878,370 A | 3/1999 | Olson | D425,466 S | 5/2000 | Todd et al. |
| 5,879,074 A | 3/1999 | Pastrick | 6,060,989 A | 5/2000 | Gehlot |
| 5,883,605 A | 3/1999 | Knapp | 6,061,002 A | 5/2000 | Weber et al. |
| 5,883,739 A | 3/1999 | Ashihara et al. | 6,062,920 A | 5/2000 | Jordan et al. |
| 5,888,431 A | 3/1999 | Tonar et al. | 6,064,508 A | 5/2000 | Forgette et al. |
| D409,540 S | 5/1999 | Muth | 6,065,840 A | 5/2000 | Caskey et al. |
| 5,899,551 A | 5/1999 | Neijzen et al. | 6,066,920 A | 5/2000 | Torihara et al. |
| 5,899,956 A | 5/1999 | Chan | 6,067,111 A | 5/2000 | Hahn et al. |
| 5,904,729 A | 5/1999 | Ruzicka | 6,067,500 A | 5/2000 | Morimoto et al. |
| 5,910,854 A | 6/1999 | Varaprasad et al. | 6,068,380 A | 5/2000 | Lynn et al. |
| 5,914,815 A | 6/1999 | Bos | D426,506 S | 6/2000 | Todd et al. |
| 5,917,664 A | 6/1999 | O'Neill et al. | D426,507 S | 6/2000 | Todd et al. |
| 5,918,180 A | 6/1999 | Dimino | D427,128 S | 6/2000 | Mathieu |
| 5,923,027 A | 7/1999 | Stam et al. ................ 250/208.1 | 6,072,391 A | 6/2000 | Suzukie et al. |
| 5,923,457 A | 7/1999 | Byker et al. | 6,074,077 A | 6/2000 | Pastrick et al. |
| 5,924,212 A | 7/1999 | Domanski | 6,074,777 A | 6/2000 | Reimers et al. |
| 5,926,087 A | 7/1999 | Busch et al. | 6,076,948 A | 6/2000 | Bukosky et al. |
| 5,927,792 A | 7/1999 | Welling et al. | 6,078,355 A | 6/2000 | Zengel |
| 5,928,572 A | 7/1999 | Tonar et al. | 6,078,865 A | 6/2000 | Koyanagi |
| 5,929,786 A | 7/1999 | Schofield et al. | D428,372 S | 7/2000 | Todd et al. |
| 5,935,702 A | 8/1999 | Macquart et al. | D428,373 S | 7/2000 | Todd et al. |
| 5,938,321 A | 8/1999 | Bos et al. | 6,082,881 A | 7/2000 | Hicks |
| 5,938,721 A | 8/1999 | Dussell et al. | 6,084,700 A | 7/2000 | Knapp et al. |
| 5,940,011 A | 8/1999 | Agravante et al. | 6,086,131 A | 7/2000 | Bingle et al. |
| 5,940,120 A | 8/1999 | Frankhouse et al. | 6,086,229 A | 7/2000 | Pastrick |
| 5,940,201 A | 8/1999 | Ash et al. | 6,087,012 A | 7/2000 | Varaprasad et al. |
| 5,942,895 A | 8/1999 | Popovic et al. | 6,087,953 A | 7/2000 | DeLine et al. |

| | | | | | | | |
|---|---|---|---|---|---|---|---|
| 6,091,343 | A | 7/2000 | Dykema et al. | 6,185,501 | B1 | 2/2001 | Smith et al. |
| 6,093,976 | A | 7/2000 | Kramer et al. | 6,188,505 | B1 | 2/2001 | Lomprey et al. |
| 6,094,618 | A | 7/2000 | Harada | 6,191,704 | B1 | 2/2001 | Takenaga et al. |
| D428,842 | S | 8/2000 | Todd et al. | 6,195,194 | B1 | 2/2001 | Roberts et al. |
| D429,202 | S | 8/2000 | Todd et al. | 6,196,688 | B1 | 3/2001 | Caskey et al. |
| D430,088 | S | 8/2000 | Todd et al. | 6,198,409 | B1 | 3/2001 | Schofield et al. ............ 340/903 |
| 6,097,023 | A | 8/2000 | Schofield et al. | 6,199,014 | B1 | 3/2001 | Walker et al. |
| 6,097,316 | A | 8/2000 | Liaw et al. | 6,199,810 | B1 | 3/2001 | Wu et al. |
| 6,099,131 | A | 8/2000 | Fletcher et al. | 6,200,010 | B1 | 3/2001 | Anders |
| 6,099,155 | A | 8/2000 | Pastrick et al. | 6,201,642 | B1 | 3/2001 | Bos |
| 6,102,559 | A | 8/2000 | Nold et al. | 6,206,553 | B1 | 3/2001 | Boddy et al. |
| 6,104,552 | A | 8/2000 | Thau et al. | 6,210,008 | B1 | 4/2001 | Hoekstra et al. |
| 6,106,121 | A | 8/2000 | Buckley et al. | 6,210,012 | B1 | 4/2001 | Broer |
| 6,111,498 | A | 8/2000 | Jobes, I et al. | 6,212,470 | B1 | 4/2001 | Seymour et al. |
| 6,111,683 | A | 8/2000 | Cammenga et al. | 6,217,181 | B1 | 4/2001 | Lynam et al. |
| 6,111,684 | A | 8/2000 | Forgette et al. | 6,218,934 | B1 | 4/2001 | Regan |
| 6,111,685 | A | 8/2000 | Tench et al. | 6,222,447 | B1 | 4/2001 | Schofield et al. |
| 6,111,696 | A | 8/2000 | Allen et al. | 6,222,460 | B1 | 4/2001 | DeLine et al. ............ 340/815.4 |
| 6,115,086 | A | 9/2000 | Rosen | 6,222,689 | B1 | 4/2001 | Higuchi et al. |
| 6,115,651 | A | 9/2000 | Cruz | 6,227,689 | B1 | 5/2001 | Miller |
| 6,116,743 | A | 9/2000 | Hoek | 6,232,937 | B1 | 5/2001 | Jacobsen et al. |
| 6,118,219 | A | 9/2000 | Okigami et al. | 6,239,851 | B1 | 5/2001 | Hatazawa et al. |
| 6,122,597 | A | 9/2000 | Saneyoshi et al. | 6,239,898 | B1 | 5/2001 | Byker et al. |
| 6,122,921 | A | 9/2000 | Brezoczky et al. | 6,239,899 | B1 | 5/2001 | DeVries et al. |
| 6,124,647 | A | 9/2000 | Marcus et al. | 6,243,003 | B1 | 6/2001 | DeLine et al. ............ 340/425.5 |
| 6,124,886 | A | 9/2000 | DeLine et al. | 6,244,716 | B1 | 6/2001 | Steenwyk et al. |
| 6,127,919 | A | 10/2000 | Wylin | 6,245,262 | B1 | 6/2001 | Varaprasad et al. |
| 6,127,945 | A | 10/2000 | Mura-Smith | 6,247,820 | B1 | 6/2001 | Van Order |
| 6,128,576 | A | 10/2000 | Nishimoto et al. | 6,249,214 | B1 | 6/2001 | Kashiwazaki |
| 6,130,421 | A | 10/2000 | Bechtel et al. | 6,249,310 | B1 | 6/2001 | Lefkowitz |
| 6,130,448 | A | 10/2000 | Bauer et al. | 6,250,148 | B1 | 6/2001 | Lynam .................... 73/170.17 |
| 6,132,072 | A | 10/2000 | Turnbull et al. | 6,250,766 | B1 | 6/2001 | Strumolo et al. |
| 6,139,171 | A | 10/2000 | Waldmann | 6,250,783 | B1 | 6/2001 | Stidham et al. |
| 6,139,172 | A | 10/2000 | Bos et al. | 6,255,639 | B1 | 7/2001 | Stam et al. |
| 6,140,933 | A | 10/2000 | Bugno et al. | 6,257,746 | B1 | 7/2001 | Todd et al. |
| 6,142,656 | A | 11/2000 | Kurth | 6,259,412 | B1 | 7/2001 | Duroux |
| 6,146,003 | A | 11/2000 | Thau | 6,259,475 | B1 | 7/2001 | Ramachandran et al. |
| 6,147,934 | A | 11/2000 | Arikawa et al. | 6,262,842 | B1 | 7/2001 | Ouderkirk et al. |
| 6,148,261 | A | 11/2000 | Obradovich et al. | 6,264,353 | B1 | 7/2001 | Caraher et al. |
| 6,149,287 | A | 11/2000 | Pastrick et al. | 6,265,968 | B1 | 7/2001 | Betzitza et al. |
| 6,150,014 | A | 11/2000 | Chu et al. | 6,268,803 | B1 | 7/2001 | Gunderson et al. |
| 6,151,065 | A | 11/2000 | Steed et al. | 6,268,837 | B1 | 7/2001 | Kobayashi et al. |
| 6,151,539 | A | 11/2000 | Bergholz et al. | 6,269,308 | B1 | 7/2001 | Kodaka et al. |
| 6,152,551 | A | 11/2000 | Annas | 6,271,901 | B1 | 8/2001 | Ide et al. |
| 6,152,590 | A | 11/2000 | Fürst et al. | 6,274,221 | B2 | 8/2001 | Smith et al. |
| 6,154,149 | A | 11/2000 | Tyckowski et al. | 6,276,821 | B1 | 8/2001 | Pastrick et al. |
| 6,154,306 | A | 11/2000 | Varaprasad et al. | 6,276,822 | B1 | 8/2001 | Bedrosian et al. |
| 6,157,294 | A | 12/2000 | Urai et al. | 6,277,471 | B1 | 8/2001 | Tang |
| 6,157,418 | A | 12/2000 | Rosen | 6,278,271 | B1 | 8/2001 | Schott |
| 6,158,655 | A | 12/2000 | DeVries, Jr. et al. ........ 235/380 | 6,278,377 | B1 | 8/2001 | DeLine et al. |
| 6,161,865 | A | 12/2000 | Rose et al. | 6,278,941 | B1 | 8/2001 | Yokoyama |
| 6,166,625 | A | 12/2000 | Teowee et al. | 6,280,068 | B1 | 8/2001 | Mertens et al. |
| 6,166,629 | A | 12/2000 | Hamma et al. | 6,280,069 | B1 | 8/2001 | Pastrick et al. |
| 6,166,847 | A | 12/2000 | Tench et al. | 6,281,804 | B1 | 8/2001 | Haller et al. |
| 6,166,848 | A | 12/2000 | Cammenga et al. | 6,286,965 | B1 | 9/2001 | Caskey et al. |
| 6,167,755 | B1 | 1/2001 | Damson et al. | 6,286,984 | B1 | 9/2001 | Berg |
| 6,169,955 | B1 | 1/2001 | Fultz | 6,289,332 | B2 | 9/2001 | Menig et al. |
| 6,170,956 | B1 | 1/2001 | Rumsey et al. | 6,290,378 | B1 | 9/2001 | Buchalla et al. |
| 6,172,600 | B1 | 1/2001 | Kakinama et al. | 6,291,906 | B1 | 9/2001 | Marcus et al. |
| 6,172,601 | B1 | 1/2001 | Wada et al. | 6,294,989 | B1 | 9/2001 | Schofield et al. |
| 6,172,613 | B1 | 1/2001 | DeLine et al. ............ 340/815.4 | 6,296,379 | B1 | 10/2001 | Pastrick |
| 6,173,501 | B1 | 1/2001 | Blank et al. | 6,297,781 | B1 | 10/2001 | Turnbull et al. |
| 6,175,164 | B1 | 1/2001 | O'Farrell et al. | 6,299,333 | B1 | 10/2001 | Pastrick et al. |
| 6,175,300 | B1 | 1/2001 | Kendrick | 6,300,879 | B1 | 10/2001 | Regan et al. |
| 6,176,602 | B1 | 1/2001 | Pastrick et al. | 6,301,039 | B1 | 10/2001 | Tench |
| 6,178,034 | B1 | 1/2001 | Allemand et al. | 6,304,173 | B2 | 10/2001 | Pala et al. |
| 6,178,377 | B1 | 1/2001 | Ishihara et al. | 6,305,807 | B1 | 10/2001 | Schierbeek |
| 6,181,387 | B1 | 1/2001 | Rosen | 6,310,611 | B1 | 10/2001 | Caldwell |
| 6,182,006 | B1 | 1/2001 | Meek | 6,310,714 | B1 | 10/2001 | Lomprey et al. |
| 6,183,119 | B1 | 2/2001 | Desmond et al. | 6,310,738 | B1 | 10/2001 | Chu |
| 6,184,679 | B1 | 2/2001 | Popovic et al. | 6,313,454 | B1 | 11/2001 | Bos et al. ................. 250/208.1 |
| 6,184,781 | B1 | 2/2001 | Ramakesavan | 6,314,295 | B1 | 11/2001 | Kawamoto |
| 6,185,492 | B1 | 2/2001 | Kagawa et al. | 6,315,440 | B1 | 11/2001 | Satoh |

| | | | | | | |
|---|---|---|---|---|---|---|
| 6,317,057 B1 | 11/2001 | Lee | | 6,445,287 B1 | 9/2002 | Schofield et al. |
| 6,317,180 B1 | 11/2001 | Kuroiwa et al. | | 6,447,128 B1 | 9/2002 | Lang et al. |
| 6,317,248 B1 | 11/2001 | Agrawal et al. | | 6,452,533 B1 | 9/2002 | Yamabuchi et al. |
| 6,318,870 B1 | 11/2001 | Spooner et al. | | 6,462,795 B1 | 10/2002 | Clarke |
| 6,320,176 B1 | 11/2001 | Schofield et al. | | 6,463,369 B2 | 10/2002 | Sadano et al. |
| 6,320,282 B1 | 11/2001 | Caldwell | | 6,466,701 B1 | 10/2002 | Ejiri et al. |
| 6,320,612 B1 | 11/2001 | Young | | 6,471,362 B1 | 10/2002 | Carter et al. |
| 6,324,295 B1 | 11/2001 | Valery et al. | | 6,472,977 B1 | 10/2002 | Pöchmüller |
| 6,326,613 B1 | 12/2001 | Heslin et al. ............... 250/239 | | 6,473,001 B1 | 10/2002 | Blum |
| 6,326,900 B2 | 12/2001 | DeLine et al. | | 6,474,853 B2 | 11/2002 | Pastrick et al. |
| 6,329,925 B1 | 12/2001 | Skiver et al. | | 6,476,731 B1 | 11/2002 | Miki et al. |
| 6,330,511 B2 | 12/2001 | Ogura et al. | | 6,477,460 B2 | 11/2002 | Kepler |
| 6,331,066 B1 | 12/2001 | Desmond et al. | | 6,477,464 B2 | 11/2002 | McCarthy et al. ........... 701/213 |
| 6,333,759 B1 | 12/2001 | Mazzilli | | 6,483,429 B1 | 11/2002 | Yasui et al. |
| 6,335,680 B1 | 1/2002 | Matsuoka | | 6,483,438 B2 | 11/2002 | DeLine et al. |
| 6,336,737 B1 | 1/2002 | Thau | | 6,487,500 B2 | 11/2002 | Lemelson et al. |
| 6,340,850 B2 | 1/2002 | O'Farrell et al. | | 6,494,602 B2 | 12/2002 | Pastrick et al. |
| 6,341,523 B2 | 1/2002 | Lynam .................... 73/170.17 | | 6,496,117 B2 * | 12/2002 | Gutta et al. ................. 340/576 |
| 6,344,805 B1 | 2/2002 | Yasui et al. | | 6,498,620 B2 | 12/2002 | Schofield et al. |
| 6,346,698 B1 | 2/2002 | Turnbull | | 6,501,387 B2 | 12/2002 | Skiver et al. |
| 6,347,880 B1 | 2/2002 | Fürst et al. | | 6,512,203 B2 | 1/2003 | Jones et al. |
| 6,348,858 B2 | 2/2002 | Weis et al. | | 6,512,624 B2 | 1/2003 | Tonar et al. |
| 6,351,708 B1 | 2/2002 | Takagi et al. | | 6,513,252 B1 | 2/2003 | Schierbeek et al. |
| 6,353,392 B1 | 3/2002 | Schofield et al. | | 6,515,581 B1 | 2/2003 | Ho |
| 6,356,206 B1 | 3/2002 | Takenaga et al. | | 6,515,582 B1 | 2/2003 | Teowee |
| 6,356,376 B1 | 3/2002 | Tonar et al. | | 6,515,597 B1 | 2/2003 | Wada et al. |
| 6,356,389 B1 | 3/2002 | Nilsen et al. | | 6,516,664 B2 | 2/2003 | Lynam .................... 75/170.17 |
| 6,357,883 B1 | 3/2002 | Strumolo et al. | | 6,519,209 B1 | 2/2003 | Arikawa et al. |
| 6,362,121 B1 | 3/2002 | Chopin et al. | | 6,520,667 B1 | 2/2003 | Mousseau |
| 6,362,548 B1 | 3/2002 | Bingle et al. | | 6,522,451 B1 | 2/2003 | Lynam |
| 6,363,326 B1 | 3/2002 | Scully | | 6,522,969 B2 | 2/2003 | Kannonji |
| 6,366,013 B1 | 4/2002 | Leenders et al. | | 6,525,707 B1 | 2/2003 | Kaneko et al. |
| 6,366,213 B2 | 4/2002 | DeLine et al. | | 6,534,884 B2 | 3/2003 | Marcus et al. |
| 6,370,329 B1 | 4/2002 | Teuchert | | 6,538,709 B1 | 3/2003 | Kurihara et al. |
| 6,371,636 B1 | 4/2002 | Wesson | | 6,539,306 B2 | 3/2003 | Turnbull et al. |
| 6,379,013 B1 | 4/2002 | Bechtel et al. | | 6,542,085 B1 | 4/2003 | Yang |
| 6,379,788 B1 | 4/2002 | Choi et al. | | 6,542,182 B1 | 4/2003 | Chutorash |
| 6,382,805 B1 | 5/2002 | Miyabukuro | | 6,543,163 B1 | 4/2003 | Ginsberg |
| 6,385,139 B1 | 5/2002 | Arikawa et al. | | 6,545,598 B1 | 4/2003 | de Villeroche |
| 6,386,742 B1 | 5/2002 | DeLine et al. | | 6,549,253 B1 | 4/2003 | Robbie et al. |
| 6,390,529 B1 | 5/2002 | Bingle et al. | | 6,549,335 B1 | 4/2003 | Trapani et al. |
| 6,390,635 B2 | 5/2002 | Whitehead et al. | | 6,550,949 B1 | 4/2003 | Bauer et al. |
| 6,396,397 B1 | 5/2002 | Bos et al. | | 6,552,326 B2 | 4/2003 | Turnbull |
| 6,396,637 B2 | 5/2002 | Roest et al. | | 6,553,308 B1 | 4/2003 | Uhlmann et al. |
| 6,407,847 B1 | 6/2002 | Poll et al. | | 6,559,902 B1 | 5/2003 | Kusuda et al. |
| 6,408,247 B1 | 6/2002 | Ichikawa et al. | | 6,560,027 B2 | 5/2003 | Meine |
| 6,411,204 B1 | 6/2002 | Bloomfield et al. | | 6,566,821 B2 | 5/2003 | Nakatsuka et al. |
| 6,412,959 B1 | 7/2002 | Tseng | | 6,567,060 B1 | 5/2003 | Sekiguchi |
| 6,412,973 B1 | 7/2002 | Bos et al. .................... 362/494 | | 6,568,839 B1 | 5/2003 | Pastrick et al. |
| 6,414,910 B1 | 7/2002 | Kaneko et al. | | 6,572,233 B1 | 6/2003 | Northman et al. |
| 6,415,230 B1 | 7/2002 | Maruko et al. | | 6,573,957 B1 | 6/2003 | Suzuki |
| 6,416,208 B2 | 7/2002 | Pastrick et al. | | 6,573,963 B2 | 6/2003 | Ouderkirk et al. |
| 6,417,786 B2 | 7/2002 | Learman et al. | | 6,575,643 B2 | 6/2003 | Takahashi |
| 6,418,376 B1 | 7/2002 | Olson | | 6,580,373 B1 | 6/2003 | Ohashi |
| 6,419,300 B1 | 7/2002 | Pavao et al. | | 6,580,479 B1 | 6/2003 | Sekiguchi et al. |
| 6,420,975 B1 | 7/2002 | DeLine et al. | | 6,580,562 B2 | 6/2003 | Aoki et al. |
| 6,421,081 B1 | 7/2002 | Markus | | 6,581,007 B2 | 6/2003 | Hasegawa et al. |
| 6,424,272 B1 | 7/2002 | Gutta et al. | | 6,583,730 B2 | 6/2003 | Lang et al. |
| 6,424,273 B1 | 7/2002 | Gutta et al. | | 6,591,192 B2 | 7/2003 | Okamura et al. |
| 6,424,892 B1 | 7/2002 | Matsuoka | | 6,592,230 B2 | 7/2003 | Dupay |
| 6,426,492 B1 | 7/2002 | Bos et al. | | 6,593,565 B2 | 7/2003 | Heslin et al. ................ 250/239 |
| 6,426,568 B2 | 7/2002 | Turnbull et al. | | 6,593,984 B2 | 7/2003 | Arakawa et al. |
| 6,427,349 B1 | 8/2002 | Blank et al. | | 6,594,065 B2 | 7/2003 | Byker et al. |
| 6,428,172 B1 | 8/2002 | Hutzel et al. | | 6,594,067 B2 | 7/2003 | Poll et al. |
| 6,433,676 B2 | 8/2002 | DeLine et al. | | 6,594,090 B2 | 7/2003 | Kruschwitz et al. |
| 6,433,680 B1 | 8/2002 | Ho | | 6,594,583 B2 | 7/2003 | Ogura et al. |
| 6,433,914 B1 | 8/2002 | Lomprey et al. | | 6,594,614 B2 | 7/2003 | Studt et al. |
| 6,437,688 B1 | 8/2002 | Kobayashi | | 6,597,489 B1 | 7/2003 | Guarr et al. |
| 6,438,491 B1 | 8/2002 | Farmer | | 6,606,183 B2 | 8/2003 | Ikai et al. |
| 6,439,755 B1 | 8/2002 | Fant, Jr. et al. | | 6,611,202 B2 | 8/2003 | Schofield et al. |
| 6,441,872 B1 | 8/2002 | Ho | | 6,611,227 B1 | 8/2003 | Nebiyeloul-Kifle et al. |
| 6,441,943 B2 | 8/2002 | Roberts et al. | | 6,611,759 B2 | 8/2003 | Brosche |
| 6,441,963 B2 | 8/2002 | Murakami et al. | | 6,614,387 B1 | 9/2003 | Deadman |

| | | |
|---|---|---|
| 6,614,579 B2 | 9/2003 | Roberts et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | DeLine et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,708 B1 | 12/2003 | Bechtel et al. |
| 6,661,482 B2 | 12/2003 | Hara |
| 6,661,830 B1 | 12/2003 | Reed et al. |
| 6,665,592 B2 | 12/2003 | Kodama |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsberg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,109 B2 | 6/2004 | Bos |
| 6,759,113 B1 | 7/2004 | Tang |
| 6,759,945 B2 | 7/2004 | Richard |
| 6,760,157 B1 | 7/2004 | Allen et al. |
| 6,773,116 B2 | 8/2004 | De Vaan et al. |
| 6,774,356 B2 | 8/2004 | Heslin et al. ................ 250/239 |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,810,323 B1 | 10/2004 | Bullock et al. |
| 6,819,231 B2 | 11/2004 | Berberich et al. |
| 6,824,281 B2 | 11/2004 | Schofield et al. |
| 6,832,848 B2 | 12/2004 | Pastrick |
| 6,834,969 B2 | 12/2004 | Bade et al. |
| 6,836,725 B2 | 12/2004 | Millington et al. |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. ............. 362/494 |
| 6,882,287 B2 | 4/2005 | Schofield |
| 6,889,064 B2 | 5/2005 | Baratono et al. |
| 6,891,563 B2 | 5/2005 | Schofield et al. |
| 6,902,284 B2 | 6/2005 | Hutzel et al. |
| 6,906,632 B2 | 6/2005 | DeLine et al. |
| 6,910,779 B2 | 6/2005 | Abel et al. |
| 6,912,396 B2 | 6/2005 | Sziraki et al. |
| 6,916,099 B2 | 7/2005 | Su et al. |
| 6,922,902 B2 | 8/2005 | Schierbeek et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,934,067 B2 | 8/2005 | Ash et al. |
| 6,946,978 B2 | 9/2005 | Schofield |
| 6,947,576 B2 | 9/2005 | Stam et al. |
| 6,947,577 B2 | 9/2005 | Stam et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,961,178 B2 | 11/2005 | Sugino et al. |
| 6,963,438 B2 | 11/2005 | Busscher et al. |
| 6,968,273 B2 | 11/2005 | Ockerse et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,992,718 B1 | 1/2006 | Takahara |
| 7,001,058 B2 | 2/2006 | Inditsky |
| 7,004,592 B2 | 2/2006 | Varaprasad et al. |
| 7,004,593 B2 | 2/2006 | Weller et al. |
| 7,006,173 B1 | 2/2006 | Hiyama et al. |
| 7,009,751 B2 | 3/2006 | Tonar et al. |
| 7,012,543 B2 | 3/2006 | DeLine et al. |
| 7,041,965 B2 | 5/2006 | Heslin et al. ................ 250/239 |
| 7,042,616 B2 | 5/2006 | Tonar et al. |
| 7,046,418 B2 | 5/2006 | Lin et al. |
| 7,046,448 B2 | 5/2006 | Burgner |
| 7,057,681 B2 | 6/2006 | Hinata et al. |
| 7,063,893 B2 | 6/2006 | Hoffman |

| | | | | | | |
|---|---|---|---|---|---|---|
| 7,064,882 | B2 | 6/2006 | Tonar et al. | 7,372,611 B2 | 5/2008 | Tonar et al. |
| 7,074,486 | B2 | 7/2006 | Boire et al. | 7,375,895 B2 | 5/2008 | Brynielsson |
| 7,081,810 | B2 | 7/2006 | Henderson et al. | 7,379,224 B2 | 5/2008 | Tonar et al. |
| 7,092,052 | B2 | 8/2006 | Okamoto et al. | 7,379,225 B2 | 5/2008 | Tonar et al. |
| 7,106,213 | B2 | 9/2006 | White | 7,379,243 B2 | 5/2008 | Horsten et al. |
| 7,108,409 | B2 | 9/2006 | DeLine et al. | 7,379,814 B2 | 5/2008 | Ockerse et al. |
| 7,121,028 | B2 | 10/2006 | Shoen et al. | 7,389,171 B2 | 6/2008 | Rupp |
| 7,125,131 | B2 | 10/2006 | Olczak | 7,396,147 B2 | 7/2008 | Munro |
| 7,130,727 | B2 | 10/2006 | Liu et al. | 7,411,732 B2 | 8/2008 | Kao et al. |
| 7,132,064 | B2 | 11/2006 | Li et al. | 7,412,328 B2 | 8/2008 | Uhlmann et al. |
| 7,136,091 | B2 | 11/2006 | Ichikawa et al. | 7,417,781 B2 | 8/2008 | Tonar et al. |
| 7,138,974 | B2 | 11/2006 | Hirakata et al. | 7,420,159 B2 | 9/2008 | Heslin et al. |
| 7,149,613 | B2 | 12/2006 | Stam et al. | 7,446,462 B2 | 11/2008 | Lim et al. |
| 7,151,515 | B2 | 12/2006 | Kim et al. | 7,446,650 B2 | 11/2008 | Scholfield et al. |
| 7,151,997 | B2 | 12/2006 | Uhlmann et al. | 7,446,924 B2 | 11/2008 | Schofield et al. |
| 7,153,588 | B2 | 12/2006 | McMan et al. | 7,448,776 B2 | 11/2008 | Tang |
| 7,154,657 | B2 | 12/2006 | Poll et al. | 7,452,090 B2 | 11/2008 | Weller et al. |
| 7,158,881 | B2 | 1/2007 | McCarthy et al. | 7,455,412 B2 | 11/2008 | Rottcher |
| 7,160,017 | B2 | 1/2007 | Lee et al. | 7,467,883 B2 | 12/2008 | DeLine et al. |
| 7,167,796 | B2 | 1/2007 | Taylor et al. | 7,468,651 B2 | 12/2008 | DeLine et al. |
| 7,175,291 | B1 | 2/2007 | Li | 7,471,438 B2 | 12/2008 | McCabe et al. |
| 7,176,790 | B2 | 2/2007 | Yamazaki | 7,477,439 B2 | 1/2009 | Tonar et al. |
| 7,184,190 | B2 | 2/2007 | McCabe et al. | 7,480,149 B2 | 1/2009 | DeWard et al. |
| 7,187,498 | B2 | 3/2007 | Bengoechea et al. | 7,489,374 B2 | 2/2009 | Utsumi et al. |
| 7,188,963 | B2 | 3/2007 | Schofield et al. | 7,490,007 B2 | 2/2009 | Taylor et al. |
| 7,193,764 | B2 | 3/2007 | Lin et al. | 7,490,943 B2 | 2/2009 | Kikuchi et al. |
| 7,195,381 | B2 | 3/2007 | Lynam et al. | 7,490,944 B2 | 2/2009 | Blank et al. |
| 7,199,767 | B2 | 4/2007 | Spero | 7,494,231 B2 | 2/2009 | Varaprasad et al. |
| 7,206,697 | B2 | 4/2007 | Olney et al. | 7,496,439 B2 | 2/2009 | McCormick |
| 7,209,277 | B2 | 4/2007 | Tonar et al. | 7,502,156 B2 | 3/2009 | Tonar et al. |
| 7,215,473 | B2 | 5/2007 | Fleming | 7,505,188 B2 | 3/2009 | Niiyama et al. |
| 7,221,363 | B2 | 5/2007 | Roberts et al. | 7,511,607 B2 | 3/2009 | Hubbard et al. |
| 7,224,324 | B2 | 5/2007 | Quist et al. | 7,511,872 B2 | 3/2009 | Tonar et al. |
| 7,230,523 | B2 | 6/2007 | Harter, Jr. et al. | 7,526,103 B2 | 4/2009 | Schofield et al. |
| 7,232,231 | B2 | 6/2007 | Shih | 7,538,316 B2 | 5/2009 | Heslin et al. |
| 7,233,304 | B1 | 6/2007 | Aratani et al. | 7,540,620 B2 | 6/2009 | Weller et al. |
| 7,235,918 | B2 | 6/2007 | McCullough et al. | 7,541,570 B2 | 6/2009 | Drummond et al. |
| 7,241,037 | B2 | 7/2007 | Mathieu et al. | 7,547,467 B2 | 6/2009 | Olson et al. |
| 7,245,207 | B1 | 7/2007 | Dayan et al. | 7,548,291 B2 | 6/2009 | Lee et al. |
| 7,245,336 | B2 | 7/2007 | Hiyama et al. | 7,551,354 B2 | 6/2009 | Horsten et al. |
| 7,248,305 | B2 | 7/2007 | Ootsuta et al. | 7,562,985 B2 | 7/2009 | Cortenraad et al. |
| 7,251,079 | B2 | 7/2007 | Capaldo et al. | 7,567,291 B2 | 7/2009 | Bechtel et al. |
| 7,255,451 | B2 | 8/2007 | McCabe et al. | 7,571,038 B2 | 8/2009 | Butler et al. |
| 7,255,465 | B2 | 8/2007 | DeLine et al. | 7,571,042 B2 | 8/2009 | Taylor et al. |
| 7,262,406 | B2 | 8/2007 | Heslin et al. | 7,572,490 B2 | 8/2009 | Park et al. |
| 7,262,916 | B2 | 8/2007 | Kao et al. | 7,580,795 B2 | 8/2009 | McCarthy et al. |
| 7,265,342 | B2 | 9/2007 | Heslin et al. | 7,581,867 B2 | 9/2009 | Lee et al. |
| 7,268,841 | B2 | 9/2007 | Kasajima et al. | 7,586,566 B2 | 9/2009 | Nelson et al. |
| 7,269,327 | B2 | 9/2007 | Tang | 7,586,666 B2 | 9/2009 | McCabe et al. |
| 7,269,328 | B2 | 9/2007 | Tang | 7,589,893 B2 | 9/2009 | Rottcher |
| 7,271,951 | B2 | 9/2007 | Weber et al. | 7,619,508 B2 | 11/2009 | Lynam et al. |
| 7,274,501 | B2 | 9/2007 | McCabe et al. | 7,623,202 B2 | 11/2009 | Araki et al. |
| 7,281,491 | B2 | 10/2007 | Iwamaru | 7,636,188 B2 | 12/2009 | Baur et al. |
| 7,286,280 | B2 | 10/2007 | Whitehead et al. | 7,636,195 B2 | 12/2009 | Nieuwkerk et al. |
| 7,287,868 | B2 | 10/2007 | Carter et al. | 7,636,930 B2 | 12/2009 | Chang |
| 7,290,919 | B2 | 11/2007 | Pan et al. | 7,643,927 B2 | 1/2010 | Hils |
| 7,292,208 | B1 | 11/2007 | Park et al. | 7,658,521 B2 | 2/2010 | DeLine et al. |
| 7,308,341 | B2 | 12/2007 | Schofield et al. | 7,667,579 B2 | 2/2010 | DeLine et al. |
| 7,310,177 | B2 | 12/2007 | McCabe et al. | 7,688,495 B2 | 3/2010 | Tonar et al. |
| 7,311,428 | B2 | 12/2007 | DeLine et al. | 7,696,964 B2 | 4/2010 | Lankhorst et al. |
| 7,316,485 | B2 | 1/2008 | Roose | 7,706,046 B2 | 4/2010 | Bauer et al. |
| 7,323,819 | B2 | 1/2008 | Hong et al. | 7,746,534 B2 | 6/2010 | Tonar et al. |
| 7,324,261 | B2 | 1/2008 | Tonar et al. | 7,787,077 B2 | 8/2010 | Kondoh et al. |
| 7,327,225 | B2 | 2/2008 | Nicholas et al. | 7,791,694 B2 | 9/2010 | Molsen et al. |
| 7,327,226 | B2 | 2/2008 | Turnbull et al. | 7,830,583 B2 | 11/2010 | Neuman et al. |
| 7,327,855 | B1 | 2/2008 | Chen | 7,842,154 B2 | 11/2010 | Lynam |
| 7,328,103 | B2 | 2/2008 | McCarthy et al. | 2001/0019356 A1 | 9/2001 | Takeda et al. |
| 7,329,013 | B2 | 2/2008 | Blank et al. | 2001/0022616 A1 | 9/2001 | Rademacher et al. |
| 7,338,177 | B2 | 3/2008 | Lynam | 2001/0026215 A1 | 10/2001 | Nakaho et al. |
| 7,344,284 | B2 | 3/2008 | Lynam et al. | 2001/0026316 A1 | 10/2001 | Senatore |
| 7,349,143 | B2 | 3/2008 | Tonar et al. | 2001/0030857 A1 | 10/2001 | Futhey et al. |
| 7,362,505 | B2 | 4/2008 | Hikmet et al. | 2001/0045981 A1 | 11/2001 | Gloger et al. |
| 7,370,983 | B2 | 5/2008 | DeWind et al. | 2002/0003571 A1 | 1/2002 | Schofield et al. |

| Publication No. | Date | Inventor |
|---|---|---|
| 2002/0044065 A1 | 4/2002 | Quist et al. |
| 2002/0049535 A1 | 4/2002 | Rigo et al. |
| 2002/0072026 A1 | 6/2002 | Lynam et al. |
| 2002/0085155 A1 | 7/2002 | Arikawa |
| 2002/0092958 A1 | 7/2002 | Lusk |
| 2002/0093826 A1 | 7/2002 | Bos et al. |
| 2002/0113203 A1 | 8/2002 | Heslin et al. |
| 2002/0118321 A1 | 8/2002 | Ge |
| 2002/0126497 A1 | 9/2002 | Pastrick |
| 2002/0133144 A1 | 9/2002 | Chan et al. |
| 2002/0149727 A1 | 10/2002 | Wang |
| 2002/0154007 A1 | 10/2002 | Yang |
| 2002/0159270 A1 | 10/2002 | Lynam et al. |
| 2002/0172053 A1 | 11/2002 | Pastrick et al. |
| 2002/0191409 A1 | 12/2002 | DeLine et al. |
| 2002/0196639 A1 | 12/2002 | Weidel |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0016542 A1 | 1/2003 | Pastrick et al. |
| 2003/0020603 A1 | 1/2003 | DeLine et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa et al. |
| 2003/0043269 A1 | 3/2003 | Park |
| 2003/0048639 A1 | 3/2003 | Boyd et al. |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0069690 A1 | 4/2003 | Correia et al. |
| 2003/0076415 A1 | 4/2003 | Strumbolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0095331 A1 | 5/2003 | Bengoechea et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minuado et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0147244 A1 | 8/2003 | Tenmyo |
| 2003/0156193 A1 | 8/2003 | Nakamura |
| 2003/0169158 A1 | 9/2003 | Paul, Jr. |
| 2003/0169522 A1 | 9/2003 | Schofield et al. |
| 2003/0179293 A1 | 9/2003 | Oizumi |
| 2003/0189754 A1 | 10/2003 | Sugino et al. |
| 2003/0202096 A1 | 10/2003 | Kim |
| 2003/0210369 A1 | 11/2003 | Wu |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0032675 A1 | 2/2004 | Weller et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0080431 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0105614 A1 | 6/2004 | Kobayashi et al. |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0128065 A1 | 7/2004 | Taylor et al. |
| 2004/0145457 A1 | 7/2004 | Schofield et al. |
| 2004/0170008 A1 | 9/2004 | Tenmyo |
| 2004/0202001 A1 | 10/2004 | Roberts et al. |
| 2004/0243303 A1 | 12/2004 | Padmanabhan |
| 2004/0251804 A1 | 12/2004 | McCullough et al. |
| 2005/0024591 A1 | 2/2005 | Lian et al. |
| 2005/0024729 A1 | 2/2005 | Ockerse et al. |
| 2005/0078347 A1 | 4/2005 | Lin et al. |
| 2005/0078389 A1 | 4/2005 | Kulas et al. |
| 2005/0079326 A1 | 4/2005 | Varaprasad et al. |
| 2005/0083577 A1 | 4/2005 | Varaprasad et al. |
| 2005/0099559 A1 | 5/2005 | Lee et al. |
| 2005/0111070 A1 | 5/2005 | Lin et al. |
| 2005/0117095 A1 | 6/2005 | Ma |
| 2005/0140855 A1 | 6/2005 | Utsumi et al. |
| 2005/0168995 A1 | 8/2005 | Kittelmann et al. |
| 2005/0169003 A1 | 8/2005 | Lindahl et al. |
| 2005/0172504 A1 | 8/2005 | Ohm et al. |
| 2005/0185278 A1 | 8/2005 | Horsten et al. |
| 2005/0237440 A1 | 10/2005 | Sugimura et al. |
| 2005/0270766 A1 | 12/2005 | Kung et al. |
| 2005/0270798 A1 | 12/2005 | Lee et al. |
| 2006/0001641 A1 | 1/2006 | Degwekar et al. |
| 2006/0007550 A1 | 1/2006 | Tonar et al. |
| 2006/0028730 A1 | 2/2006 | Varaprasad et al. |
| 2006/0038668 A1 | 2/2006 | DeWard et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0164230 A1 | 7/2006 | DeWind et al. |
| 2006/0164725 A1 | 7/2006 | Horsten et al. |
| 2006/0171704 A1 | 8/2006 | Bingle et al. |
| 2006/0202111 A1 | 9/2006 | Heslin et al. |
| 2006/0255960 A1 | 11/2006 | Uken et al. |
| 2006/0274218 A1 | 12/2006 | Xue |
| 2007/0041096 A1 | 2/2007 | Nieuwkerk et al. |
| 2007/0058257 A1 | 3/2007 | Lynam |
| 2007/0064108 A1 | 3/2007 | Haler |
| 2007/0080585 A1 | 4/2007 | Lyu |
| 2007/0118287 A1 | 5/2007 | Taylor et al. |
| 2007/0120043 A1 | 5/2007 | Heslin et al. |
| 2007/0132567 A1 | 6/2007 | Schofield et al. |
| 2007/0162229 A1 | 7/2007 | McCarthy et al. |
| 2007/0171037 A1 | 7/2007 | Schofield et al. |
| 2007/0183066 A1 | 8/2007 | Varaprasad et al. |
| 2007/0184284 A1 | 8/2007 | Varaprasad et al. |
| 2007/0201122 A1 | 8/2007 | Dozeman et al. |
| 2007/0262732 A1 | 11/2007 | Shen |
| 2008/0002106 A1 | 1/2008 | Van De Witte et al. |
| 2008/0013153 A1 | 1/2008 | McCabe et al. |
| 2008/0030311 A1 | 2/2008 | Dayan et al. |
| 2008/0068520 A1 | 3/2008 | Minikey, Jr. et al. |

| | | | | | | |
|---|---|---|---|---|---|---|
| 2008/0077882 | A1 | 3/2008 | Kramer et al. | EP | 0615882 A2 | 9/1994 |
| 2008/0094684 | A1 | 4/2008 | Varaprasad et al. | EP | 0667254 A1 | 8/1995 |
| 2008/0094685 | A1 | 4/2008 | Varaprasad et al. | EP | 0729864 A1 | 12/1995 |
| 2008/0180529 | A1 | 7/2008 | Taylor et al. | EP | 0728618 A2 | 8/1996 |
| 2008/0180781 | A1 | 7/2008 | Varaprasad et al. | EP | 0769419 A2 | 4/1997 |
| 2008/0183355 | A1 | 7/2008 | Taylor et al. | EP | 0788947 A1 | 8/1997 |
| 2008/0201075 | A1 | 8/2008 | Taylor et al. | EP | 0825477 | 2/1998 |
| 2008/0212189 | A1 | 9/2008 | Baur et al. | EP | 0830267 A2 | 3/1998 |
| 2008/0212215 | A1 | 9/2008 | Schofield et al. | EP | 0830985 | 3/1998 |
| 2008/0225538 | A1 | 9/2008 | Lynam et al. | EP | 0928723 A2 | 7/1999 |
| 2008/0266389 | A1 | 10/2008 | DeWind et al. | EP | 937601 A2 | 8/1999 |
| 2008/0291522 | A1 | 11/2008 | Varaprasad et al. | EP | 1075986 | 2/2001 |
| 2008/0308219 | A1 | 12/2008 | Lynam | EP | 1097848 A | 5/2001 |
| 2009/0002491 | A1 | 1/2009 | Haler | EP | 1152285 A2 | 11/2001 |
| 2009/0015736 | A1 | 1/2009 | Weller et al. | EP | 1256833 | 11/2002 |
| 2009/0033837 | A1 | 2/2009 | Molsen et al. | EP | 1376207 A1 | 1/2004 |
| 2009/0040465 | A1 | 2/2009 | Conner et al. | EP | 1315639 | 2/2006 |
| 2009/0040588 | A1 | 2/2009 | Tonar et al. | EP | 2008869 | 12/2008 |
| 2009/0040778 | A1 | 2/2009 | Takayanagi et al. | FR | 1021987 A | 2/1953 |
| 2009/0052003 | A1 | 2/2009 | Schofield et al. | FR | 1461419 | 12/1966 |
| 2009/0080055 | A1 | 3/2009 | Baur et al. | FR | 2585991 | 2/1987 |
| 2009/0085729 | A1 | 4/2009 | Nakamura et al. | FR | 2672857 A1 | 8/1992 |
| 2009/0096937 | A1 | 4/2009 | Bauer et al. | FR | 2673499 A1 | 9/1992 |
| 2009/0174776 | A1 | 7/2009 | Taylor et al. | FR | 2759045 | 8/1998 |
| 2009/0184904 | A1 | 7/2009 | S. et al. | GB | 810010 | 3/1959 |
| 2009/0201137 | A1 | 8/2009 | Weller et al. | GB | 934037 | 8/1963 |
| 2009/0219394 | A1 | 9/2009 | Heslin et al. | GB | 1008411 | 10/1965 |
| 2009/0231741 | A1 | 9/2009 | Weller et al. | GB | 1136134 | 12/1968 |
| 2009/0243824 | A1 | 10/2009 | Peterson et al. | GB | 1553376 | 9/1979 |
| 2009/0244740 | A1 | 10/2009 | Takayanagi et al. | GB | 1566451 | 4/1980 |
| 2009/0262422 | A1 | 10/2009 | Cross et al. | GB | 2137573 A | 10/1984 |
| 2009/0296190 | A1 | 12/2009 | Anderson et al. | GB | 2161440 | 1/1986 |
| 2010/0045899 | A1 | 2/2010 | Ockerse | GB | 2 210 836 A | 6/1989 |
| 2010/0085645 | A1 | 4/2010 | Skiver et al. | GB | 2222991 | 3/1990 |
| 2010/0091509 | A1 | 4/2010 | DeLine et al. | GB | 2255539 A | 11/1992 |
| 2010/0110553 | A1 | 5/2010 | Anderson et al. | GB | 2292857 A | 3/1996 |
| 2010/0165437 | A1 | 7/2010 | Tonar et al. | GB | 2297632 A | 8/1996 |
| 2010/0201896 | A1 | 8/2010 | Ostreko et al. | GB | 2351055 A | 12/2000 |
| 2010/0214662 | A1 | 8/2010 | Takayanagi et al. | GB | 2362494 | 11/2001 |
| 2010/0245701 | A1 | 9/2010 | Sato et al. | IE | 970014 | 7/1998 |
| 2010/0277786 | A1 | 11/2010 | Anderson et al. | JP | 50000638 A | 1/1975 |
| | | | | JP | 52-146988 | 11/1977 |
| | | FOREIGN PATENT DOCUMENTS | | JP | 55039843 | 3/1980 |
| CN | | 1189224 | 7/1998 | JP | 5730639 | 2/1982 |
| DE | | 941408 | 4/1956 | JP | 57208530 | 12/1982 |
| DE | | 944531 | 7/1956 | JP | 5830729 | 2/1983 |
| DE | | 7323996 | 11/1973 | JP | 58110334 A | 6/1983 |
| DE | | 2631713 A1 | 2/1977 | JP | 58209635 | 12/1983 |
| DE | | 3248511 A1 | 7/1984 | JP | 59114139 | 7/1984 |
| DE | | 3301945 | 7/1984 | JP | 60212730 | 10/1985 |
| DE | | 3614882 | 11/1987 | JP | 60261275 A | 12/1985 |
| DE | | 9306989.8 U1 | 7/1993 | JP | 61260217 | 11/1986 |
| DE | | 4329983 A1 | 3/1995 | JP | 6243543 | 2/1987 |
| DE | | 4415885 A1 | 11/1995 | JP | 62122487 A | 6/1987 |
| DE | | 4444443 A1 | 6/1996 | JP | 63-02753 | 1/1988 |
| DE | | 29703084 U1 | 6/1997 | JP | 63106730 | 5/1988 |
| DE | | 29805142 U1 | 5/1998 | JP | 63106731 | 5/1988 |
| DE | | 19741896 | 4/1999 | JP | 63-274286 | 11/1988 |
| DE | | 19755008 A1 | 7/1999 | JP | 64-14700 | 1/1989 |
| DE | | 29902344 U1 | 7/1999 | JP | 01123587 A | 5/1989 |
| DE | | 19934999 | 2/2001 | JP | 2122844 | 10/1990 |
| DE | | 19943355 | 3/2001 | JP | 03-28947 | 3/1991 |
| DE | | 20118868 | 3/2002 | JP | 03-052097 | 3/1991 |
| DE | | 10131459 | 1/2003 | JP | 3061192 A | 3/1991 |
| EP | | 0165817 A2 | 12/1985 | JP | 03-110855 | 5/1991 |
| EP | | 0202460 A2 | 11/1986 | JP | 03243914 | 10/1991 |
| EP | | 0254435 A1 | 1/1988 | JP | 4-114587 | 4/1992 |
| EP | | 0299509 A2 | 1/1989 | JP | 40245886 A | 9/1992 |
| EP | | 0450553 A2 | 10/1991 | JP | 5-213113 | 8/1993 |
| EP | | 0513476 A1 | 11/1992 | JP | 05-257142 | 10/1993 |
| EP | | 0524766 | 1/1993 | JP | 6080953 A | 3/1994 |
| EP | | 0605045 A1 | 7/1994 | JP | 6107035 A | 4/1994 |
| | | | | JP | 6227318 A | 8/1994 |

| | | |
|---|---|---|
| JP | 07-175035 | 7/1995 |
| JP | 07-266928 | 10/1995 |
| JP | 07-281185 | 10/1995 |
| JP | 7277072 | 10/1995 |
| JP | 08-008083 | 1/1996 |
| JP | 08-083581 | 3/1996 |
| JP | 08-216789 | 8/1996 |
| JP | 09-260074 | 3/1997 |
| JP | 0577657 B2 | 7/1997 |
| JP | 09-220976 | 8/1997 |
| JP | 09-266078 | 10/1997 |
| JP | 09-288262 | 11/1997 |
| JP | 10-076880 | 3/1998 |
| JP | 10-199480 | 7/1998 |
| JP | 10-206643 | 8/1998 |
| JP | 11-038381 | 2/1999 |
| JP | 11-067485 | 3/1999 |
| JP | 11078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000159014 | 6/2000 |
| JP | 2000255321 | 9/2000 |
| JP | 2000-330107 | 11/2000 |
| JP | 2001-083509 | 3/2001 |
| JP | 2001-222005 | 8/2001 |
| JP | 2002-120649 | 4/2002 |
| JP | 2002-122860 | 4/2002 |
| JP | 2002352611 | 12/2002 |
| JP | 2002352611 A | 12/2002 |
| JP | 2003267129 | 9/2003 |
| JP | 2004037944 | 2/2004 |
| JP | 2004-182156 | 7/2004 |
| JP | 2005148119 A | 6/2005 |
| JP | 2005316509 | 11/2005 |
| JP | 2005327600 A | 11/2005 |
| JP | 38-46073 | 11/2006 |
| WO | WO 82/02448 | 7/1982 |
| WO | WO 94/12368 A1 | 6/1994 |
| WO | WO 94/19212 A2 | 9/1994 |
| WO | WO 94/27262 A1 | 11/1994 |
| WO | WO 96/03475 A1 | 2/1996 |
| WO | WO 96/21581 A1 | 7/1996 |
| WO | WO 97/34186 A1 | 9/1997 |
| WO | WO 97/48134 A1 | 12/1997 |
| WO | WO 9814974 | 4/1998 |
| WO | WO 9830415 | 7/1998 |
| WO | WO 98/38547 A1 | 9/1998 |
| WO | WO 98/42796 A1 | 10/1998 |
| WO | WO 98/44384 A1 | 10/1998 |
| WO | WO 98/44385 A1 | 10/1998 |
| WO | WO 98/44386 A1 | 10/1998 |
| WO | WO 99/14943 A1 | 3/1999 |
| WO | WO 9914088 | 3/1999 |
| WO | WO 99/15360 | 4/1999 |
| WO | WO 9923828 | 5/1999 |
| WO | WO 99/45081 | 9/1999 |
| WO | WO 00/11723 A1 | 3/2000 |
| WO | WO 00/15462 A1 | 3/2000 |
| WO | WO 00/17009 A1 | 3/2000 |
| WO | WO 00/17702 A3 | 3/2000 |
| WO | WO 00/18612 | 4/2000 |
| WO | WO 00/22471 A1 | 4/2000 |
| WO | WO 00/23826 | 4/2000 |
| WO | WO 0023826 | 4/2000 |
| WO | WO 00/33134 A1 | 6/2000 |
| WO | WO 00/55685 A1 | 9/2000 |
| WO | WO 0052661 A | 9/2000 |
| WO | WO 00/66679 A1 | 11/2000 |
| WO | WO 01/01192 | 1/2001 |
| WO | WO 01/64464 A1 | 9/2001 |
| WO | WO 01/64481 A2 | 9/2001 |
| WO | WO 02/18174 | 3/2002 |
| WO | WO 02/49881 | 6/2002 |
| WO | WO 02/062623 A2 | 8/2002 |
| WO | WO 03/021343 | 3/2003 |
| WO | WO 03/065084 A1 | 8/2003 |
| WO | WO 03/079318 A1 | 9/2003 |
| WO | WO 2004/058540 | 7/2004 |
| WO | WO 2005/024500 A1 | 3/2005 |
| WO | WO 2005/045481 A1 | 5/2005 |
| WO | WO 2005/050267 A1 | 6/2005 |
| WO | WO 2005/071646 A1 | 8/2005 |
| WO | WO 2005/082015 A2 | 9/2005 |
| WO | WO 2007/103573 | 9/2007 |

OTHER PUBLICATIONS

Edgar, Julian; Goodbye 12 Volts . . . Hello 42 Volts!; Oct. 5, 1999; Autospeed 50; Issue 50; www.autospeed.co.nz/cmos/A_0319/article.html.
Kobe, Gerry; 42 Volts Goes Underhood; Mar. 2000; Automotive Industries; Cahners Publishing Company; www.findarticles.com/p/articles/mi_m3012/is_3_180/ai_61361677.
Jewett, Dale; Aug. 2000; Automotive Industries; Cahners Publising Company; www.findarticles.com/p/articles/mi_m3012/is_8_180ai_64341779.
National Semiconductor, LM78S40, Universal Switching Regulator Subsystem, National Semiconductor Corporation, Apr. 1996, p. 6.
Dana H. Ballard and Christopher M. Brown, Computer Vision, article, 4 pages Prentice-Hall, Englewood Cliffs, New Jersey, believed to be published more than one year prior to the filing date of the present application.
G. Wang, D. Renshaw, P.B. Denyer and M. Lu, CMOS Video Cameras, article, 1991, 4 pages, University of Edinburgh, UK.
N.R. Lynam, "Electrochromic Automotive Day/Night Mirror," *SAE Technical Paper Series*, 870636 (1987).
N.R. Lynam, "Smart Windows for Automobiles," *SAE Technical Paper Series*, 900419 (1990).
N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).
Kobe, Gerry, "Hypnotic Wizardry! (interior electronics)," *Automotive Industries*, vol. 169, No. 5, p. 60, published May 1989. Relevant section is entitled "Instrumentation."
SAE Information Report, "Vision Factors Considerations in Rear View Mirror Design—SAE J985 OCT88," approved Oct. 1988, and located in *1995 SAE Handbook*, vol. 3.
T. Alfey, Jr. et al., "Physical Optics of Iridescent Multilayered Plastic Films", *Polym. Eng'g & Sci.*, 9(6), 400-04 (1969).
I.F. Chang, "Electrochromic and Electrochemichromic Materials and Phenomena" in *Nonemissive Electrooptic Displays*, 155-96, A.R. Kmetz and F.K. von Willisen, eds., Plenum Press, New York (1976).
C.M. Lampert, "Electrochromic Materials and Devices for Energy Efficient Windows", *Solar Energy Mat'ls*, 11, 1-27 (1984).
Nagai et al., "Transmissive Electrochromic Device", *Opt. Mat'ls. Tech for Energy Effic. and Solar Energy Conv. IV*, 562, 39-45, C.M. Lampert, ed., SPIE—The Int'l Soc. for Opt. Eng'g (1985).
W. Schrenk et al., "Coextruded Elastomeric Optical Interference Film", *ANTEC '88*, 1703-07 (1988).
U.S. Appl. No. 08/720,237, filed Sep. 26, 1996, entitle Automotive Pyroelectric Intrusion Detection, abandoned.
Product Brochure entitled "SideMinder," published in 1993 by Autosense.
European Search Report dated Aug. 28, 2003, in European Application No. EP 00 65 0114, Publication No. EP 1 097 848, published May 9, 2001.
"Combination of rain sensing, autolamps and telephone antenna in one module," Research Disclosure, Kenneth Mason Publications, Hampshire, GB No. 412, Aug. 1998, p. 1045XP-000824825.

* cited by examiner

VEHICULAR ACCESSORY MOUNTING SYSTEM WITH A FORWARDLY-VIEWING CAMERA

CROSS REFERENCE TO RELATED APPLICATIONS

This is a continuation of U.S. patent application Ser. No. 12/197,660, filed Aug. 25, 2008, now U.S. Pat. No. 7,538,316, which is a continuation of U.S. patent application Ser. No. 11/828,880, filed Jul. 26, 2007, now U.S. Pat. No. 7,420,159, which is a continuation of U.S. patent application Ser. No. 11/699,271, filed Jan. 29, 2007, now U.S. Pat. No. 7,265,342, which is a continuation of U.S. patent application Ser. No. 11/418,906, filed May 5, 2006, now U.S. Pat. No. 7,262,406, which is a continuation of U.S. patent application Ser. No. 10/913,748, filed Aug. 6, 2004, now U.S. Pat. No. 7,041,965, which is a continuation of U.S. patent application Ser. No. 10/618,334, filed Jul. 11, 2003, now U.S. Pat. No. 6,774,356, which is a continuation of U.S. patent application Ser. No. 09/997,579, filed Nov. 29, 2001, now U.S. Pat. No. 6,593,565, which is a continuation of U.S. patent application Ser. No. 09/433,467, filed Nov. 4, 1999, now U.S. Pat. No. 6,326,613, which is a continuation-in-part of U.S. patent application Ser. No. 09/003,966, filed Jan. 7, 1998, by Niall R. Lynam, now U.S. Pat. No. 6,250,148, the disclosures of which are hereby incorporated by reference herein.

BACKGROUND AND SUMMARY OF THE INVENTION

This invention relates to a vehicle interior mirror assembly.

According to the invention there is provided a vehicle interior rearview mirror assembly comprising a housing having a front end for releasable attachment to the interior surface of the vehicle windshield, a rear end having connection means for adjustably mounting a rearview mirror unit to the housing, the housing adapted for containing a rain sensor and biasing means in use biasing the rain sensor into contact with the interior surface of the windshield, the housing containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising at least one compartment, the compartment having an opening at the front end of the housing for facing in use towards the windshield and, the compartment adapted for containing a rain sensor and for biasing the rain sensor forwardly through the first opening into contact with the interior surface of the windshield, and the housing also containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising a compartment, the compartment having a first opening at the front end of the housing for facing in use towards the windshield and the compartment having a second opening on at least one side of the housing, the compartment containing a rain sensor and means for biasing the rain sensor forwardly through the first opening into contact with the interior surface of the windshield, and the compartment containing at least one further electrical component accessible through the second opening According to the present invention there is provided a vehicle interior rearview mirror assembly comprising a housing having a front end for releasable attachment to the interior surface of the vehicle windshield, a rear end having connection means for mounting a rearview mirror unit to the housing, and an internal wall subdividing the interior of the housing into first and second compartments, the first compartment having a first opening at the front end of the housing for facing in use towards the windshield and the second compartment having a second opening on at least one side of the housing, the first compartment containing a rain sensor and means for biasing the rain sensor forwardly through the first opening into contact with the interior surface of the windshield, and the second compartment containing at least one further electrical component accessible through the second opening.

The invention further provides a vehicle interior rearview mirror assembly comprising a housing having a front end for releasable attachment to the interior surface of the vehicle windshield, a rear end having connection means for releasably mounting a rearview mirror unit to the housing, a first opening at the front end of the housing for facing in use towards the windshield, and a second opening on at least one side of the housing for facing in use towards the top edge of the windshield, the housing containing a rain sensor, means for biasing the rain sensor forwardly through the first opening into contact with the interior surface of the windshield, and at least one further electrical component accessible through the second opening. The assembly further preferably including a removable cover which mates with the housing around the second opening and in use preferably extends along the windshield towards the vehicle header, and electrical leads for the rain sensor and the further electrical component which in use are routed under the cover to the header.

The invention provides the significant advantage that a vehicle manufacturer is provided with the possibility of optionally including a variety of components with the rear view mirror assembly. This possibility is made available for example during the assembly line process where the desired components to meet a particular specification can be included in the rear view mirror assembly, Furthermore, the removable cover readily provides for the functional advantage of readily incorporating a selected component whilst at the same time providing a functionally attractive cover. The automaker is therefore provided with the considerable advantage of the possibility of providing a plurality of diverse options quickly and speedily during the assembly line process.

An embodiment of the invention will now be described, by way of example, with reference to the accompanying drawings, in which:

In certain of the figures some components are omitted or shown in dashed outline to reveal the underlying structure.

DESCRIPTION OF THE PREFERRED EMBODIMENTS

Figure 2:
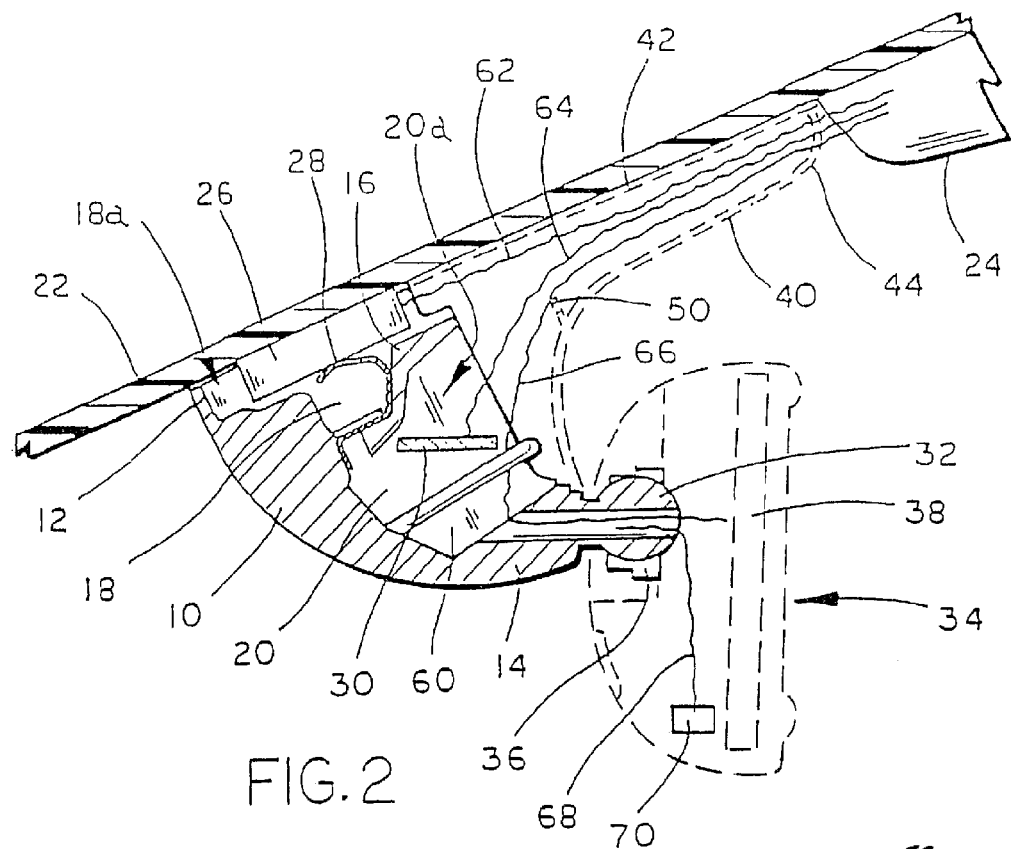
FIG. 2 is a cross-section through the mirror assembly of FIG. 1.
Figure 1:
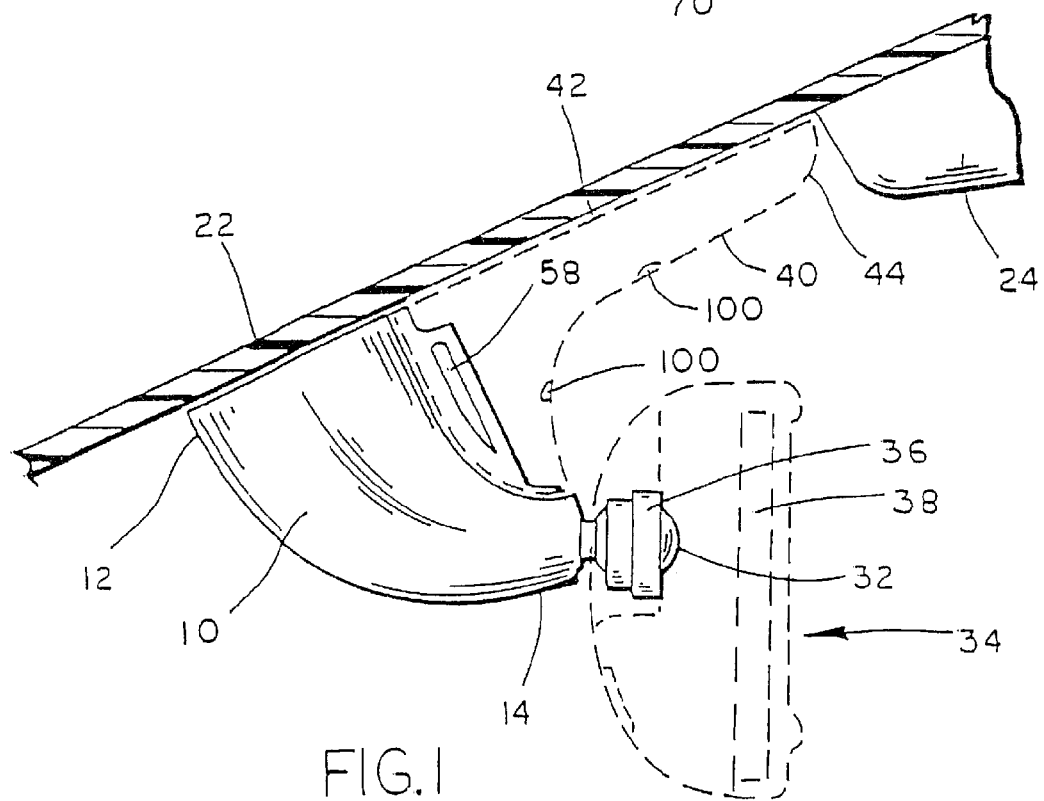
FIG. 1 is a side view of an embodiment of a vehicle interior mirror assembly according to the invention attached to the interior surface of a windshield.
Figure 3:
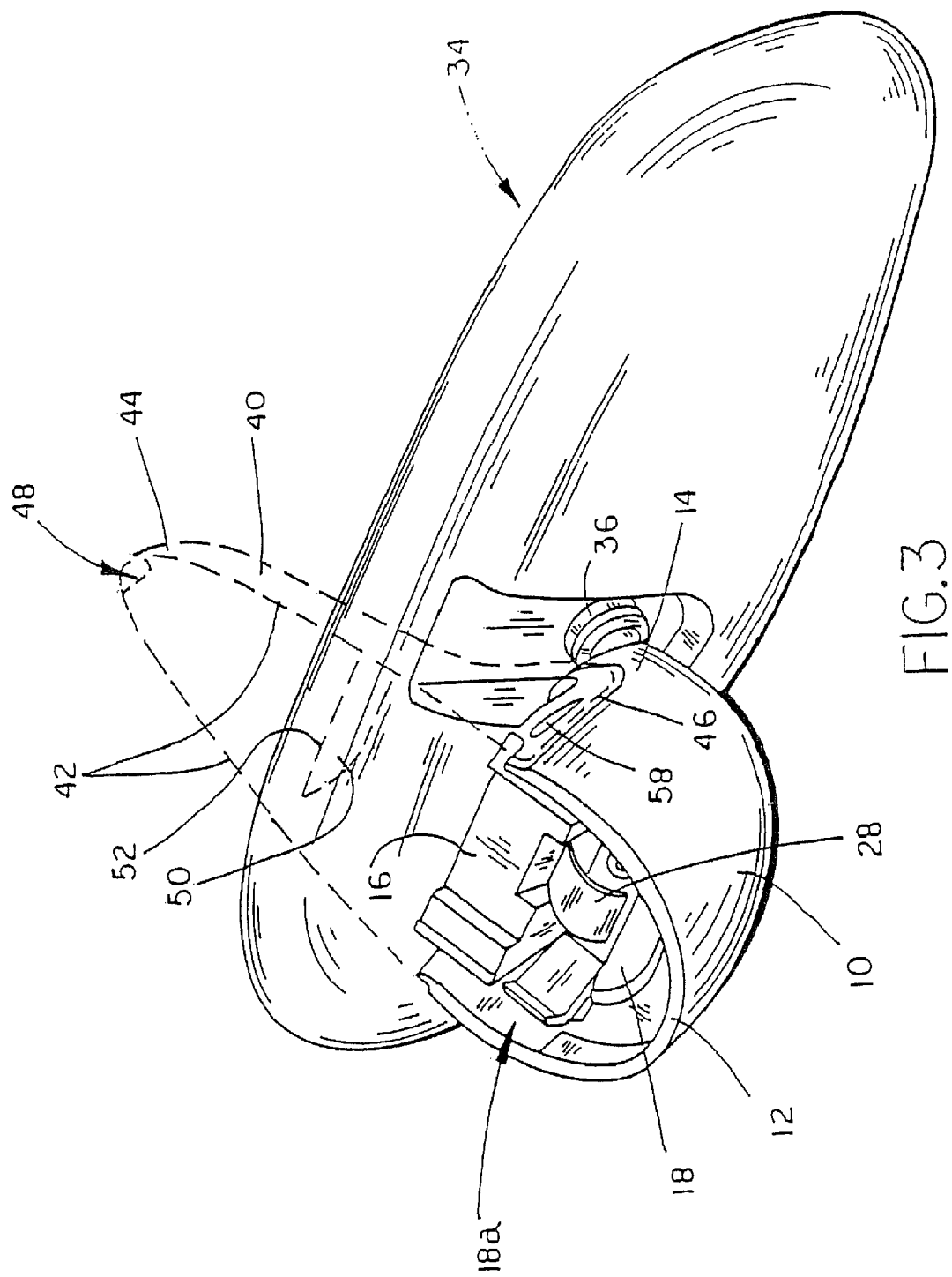
FIG. 3 is a perspective top view of the mirror assembly.
Figure 4:
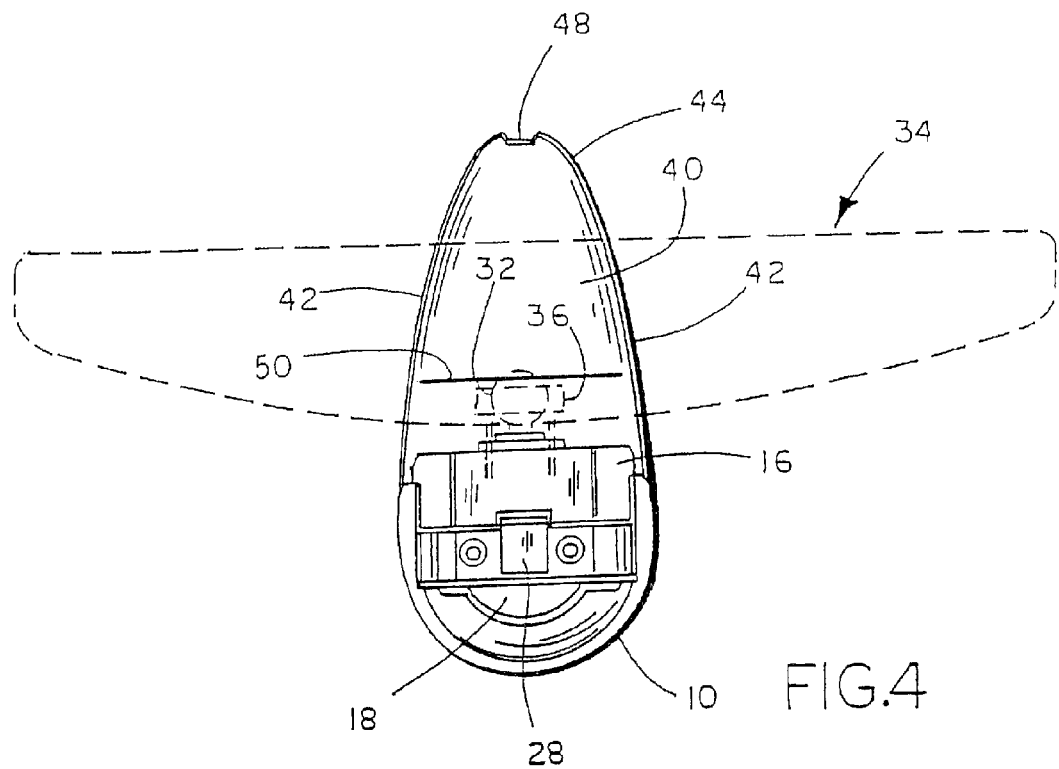
FIG. 4 is a view of the mirror assembly of FIG. 3 looking into the opening 18.

Referring to the drawings, a vehicle interior rearview mirror assembly comprises a die cast metal housing 10 (or optionally may be formed from a plastic moulding such as engineering polymeric resin such as a filled nylon or the like) having a front end 12 and a rear end 14, the front end 12 being releasably attached to the interior surface of the vehicle windshield 22 in a manner to be described. The interior of the housing 10 is subdivided by an internal wall 16 into first and second compartments 18, 20 respectively, the first compartment 18 having an opening 18*a* at the front end of the housing 10 which in use, and as shown in FIGS. 1 and 2, faces towards the windshield 22 and the second compartment having an opening 20*a* on the side of the housing which in use faces towards the vehicle header 24 at the top edge of the windshield. The front end 12 of the housing 10 is releasably attached to the windshield 22 using an annular mounting button, not shown, in the manner described in EP 0 928 723 and U.S. patent application Ser. No. 09/003,966, entitled "Rain Sensor Mount for Use in a Vehicle" to Niall R Lynam, now U.S. Pat. No. 6,250,148, the disclosures of which are incorporated herein by reference. As shown in the various figures of the Ser. No. 09/003,966 application, it is desirable that the rain sensor mounting member attached to the windshield and the rearview mirror mounting button provided on the rain sensor module are generally aligned along a common axis when the rain sensor module is mounted to the vehicle in order to provide a mounting of a rearview mirror assembly to the rain sensor module that is generally coaxial with the mounting of the rain sensor module to the windshield. Optionally, a ceramic black frit layer, as is commonly known in the windshield fabrication art, can be used on the inner surface of the windshield to hide the attachment location of the rain sensor module. However, the center portion of such a ceramic layer should include a central opening or at least provide efficient transmission for the output of the light emitters and the rain sensor unit at the point of contact of its detecting surface to the windshield or to an adhesive layer. The rain sensor module assembly includes the rain sensor unit, which is positioned in the housing and projects through an opening or port provided on a windshield facing side of the housing and extends through an inner hollow open central portion of the rain sensor mounting button to contact the inner surface of the Windshield. The rain sensor unit preferably comprises a compact rain sensor unit available from ITT Automotive Europe, GMBH of Frankfurt, Germany. The rain sensor unit includes a detecting surface which projects through an opening provided in adhesive layer so that direct contact is achieved between the inner surface of the windshield and the detecting surface of the rain sensor unit, and also includes a light emitting source and a light detecting source along with associated electronic circuitry for generating an electrical signal indicative of detection of moisture on the outer surface of the windshield. Light emitted by the emitter passes through the rain sensor detecting surface and is refracted at the outer windshield surface, and re-enters the rain sensor at its detecting surface to impinge the light detector of the rain sensor, whose output is processed by electronic circuitry to detect the presence/absence of moisture on the windshield. The circuitry (in whole or in part) can be contained in the rain sensor and/or within the housing of the module. Optionally, the electronic circuitry can be located/share components with/receive input from or deliver output electrical accessories in the vehicle, such as a CAN bus, electronically equipped mirrors such as lighted mirror and automatic dimming electrochromic mirrors, overhead consoles, and similar electrically functioning vehicle components. Electrical connectors can be accommodated at the rain sensor module, such as at or on its housing. The rain sensor can be separately removable from the module for service, or can be an integral part of the module so that a unitary module is provided by a supplier to the automaker for mating with a windshield mounting member as the vehicle passes along the vehicle assembly line (or at a local ready-to-install windshield supply plant), and thereafter for attachment thereto of a rearview mirror assembly. The electrical signal output by the rain sensor can be used to automatically operate the wiper system for the windshield and/or the backlite, or operate other Vehicular functions such as close a sunroof in the event of rain or change the braking and/or traction characteristics of the vehicle braking and/or traction control systems.

The compartment 18 contains a rain sensor 26, preferably a compact rain sensor module available from ITT Automotive Europe GmbH of Frankfurt, Germany. The compartment 18 preferably also contains an arcuate steel spring finger 28 which is secured to the base of the compartment 18 behind the rain sensor 26 and preferably serves to bias the rain sensor 26 through the aperture in the mounting button and the opening 18*a* into optical contact with the windshield 22. Most preferably, rain sensor 26 is a module which has a cross section diameter of at least 25 millimeters (mm), more preferably at least 30 mm, but with a maximum diameter≦50 mm, more preferably≦40 mm, and most preferably≦35 mm.

The compartment 20 contains at least one further electrical component which is accessible through the opening 20*a*. In the present embodiment the component is a printed circuit board 30 bearing a compass sensor such as a flux gate, magnetoinductive, magnetoresistive or magnetocapacitive sensor.

At its rear end 14 the housing 10 has an integral ball 32 for releasably and adjustably mounting a rearview mirror unit 34 to the housing 10 generally in conventional manner. The mirror unit 34 comprises a mirror housing 36 containing a mirror 38 which is preferably an electro-optic mirror comprising front and rear plates separated by a space which contains an electro-optic medium such as an electrochromic medium allowing variation in the amount of light transmitted through the medium by varying the strength of an electric field applied across the medium. Alternatively a prismatic mirror element can be used. Such mirrors are well known in the art. The ball 32 constitutes one part of a ball and socket joint, the socket 36 being carried by the mirror housing 36. The mirror housing is adjustable about the ball and socket joint. Advantageously, the housing 10 is fixedly attached to the windshield when mounted thereto. Thus, adjustment of the mirror housing to set the field of rearward view of the mirror reflective element therein does not effect the position/orientation of rain sensor and any other accessory housed in fixedly-attached housing 10. This is particularly advantageous when the electrical accessory in housing 10 comprises a compass sensor such as a magneto-resistive sensor, a magneto-inductive sensor, a magneto-capacitive sensor or a flux-gate sensor. By having the housing 10 be fixedly attached, and by having it accommodate at least two electrical accessories (at least one of which preferably comprises a rain sensor that is mounted in the housing 10 so as to view through and preferably contact the windshield inner surface, and with the rain sensor attached to the windshield generally coaxial with the mirror unit that is adjustable about housing 10), a compact overall interior mirror system is provided comprising a housing accommodating a plurality of electrical accessories, the housing fixedly and detachably mounted to a receiving structure on the inner surface (typically a glass surface) of the vehicle windshield and with a mirror unit comprising a mirror support arm and a mirror housing including a reflector element, the mirror support arm/mirror housing being adjustable about the fixed housing (and optionally detachable therefrom). In this manner, the housing 10 presents a minimal footprint when viewed from outside the vehicle through the vehicle windshield.

Figure 7:
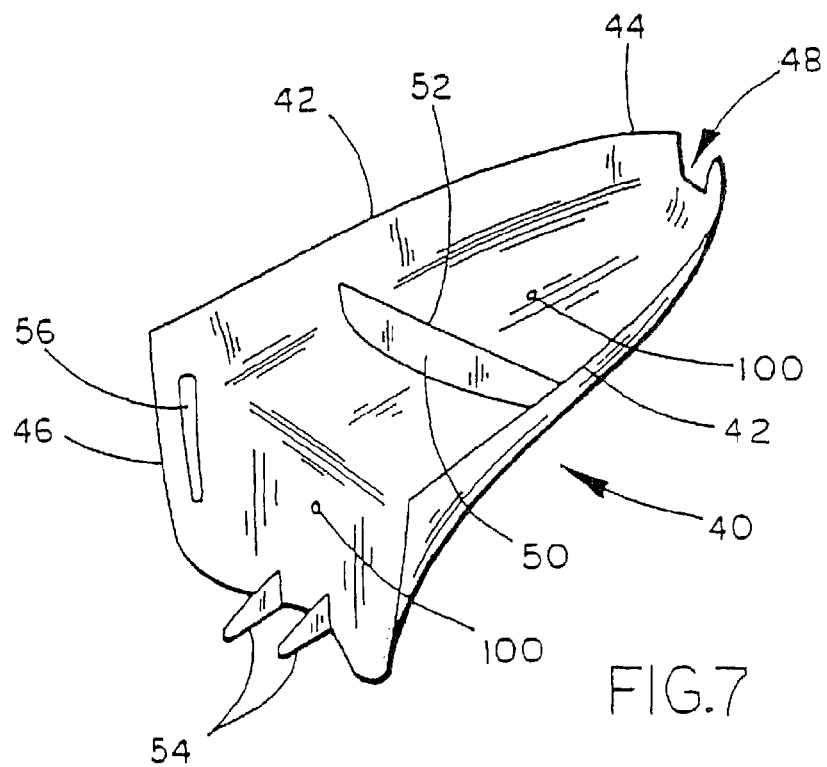
FIG. 7 is a perspective view of the wiring cover forming part of the mirror assembly.

The assembly further includes a removable cover 40 which mates with the housing 10 around the opening 20a and extends along the windshield to the vehicle header 24. The cover 40, which is longitudinally symmetric, is moulded from a resilient, polymeric or plastics material and comprises a pair of opposite, substantially coplanar, longitudinal side edges 42, FIG. 7, which diverge from a relatively narrow rear end 44 of the cover 40 to a relative wide flared front end 46. The flared front end 46 of the cover is open, and there is also a small opening 48 at the narrow rear end 44. The cover 40 has an internal strengthening wall 50 whose free edge 52 is recessed below the level of the edges 42. At its flared front end the cover 40 has a pair of forward projections 54, and the inside surface of the cover has a pair of raised ridges 56 (only one is seen in FIG. 7) each extending along a respective side of the cover adjacent to the front end 46.

The exterior surface of the housing 10 has a corresponding pair of elongated grooves or depressions 58 along each side of the opening 20a, the exterior width of the housing across the opening 20a being substantially the same as the interior width of the cover 40 across the grooves 58.

Figure 5:
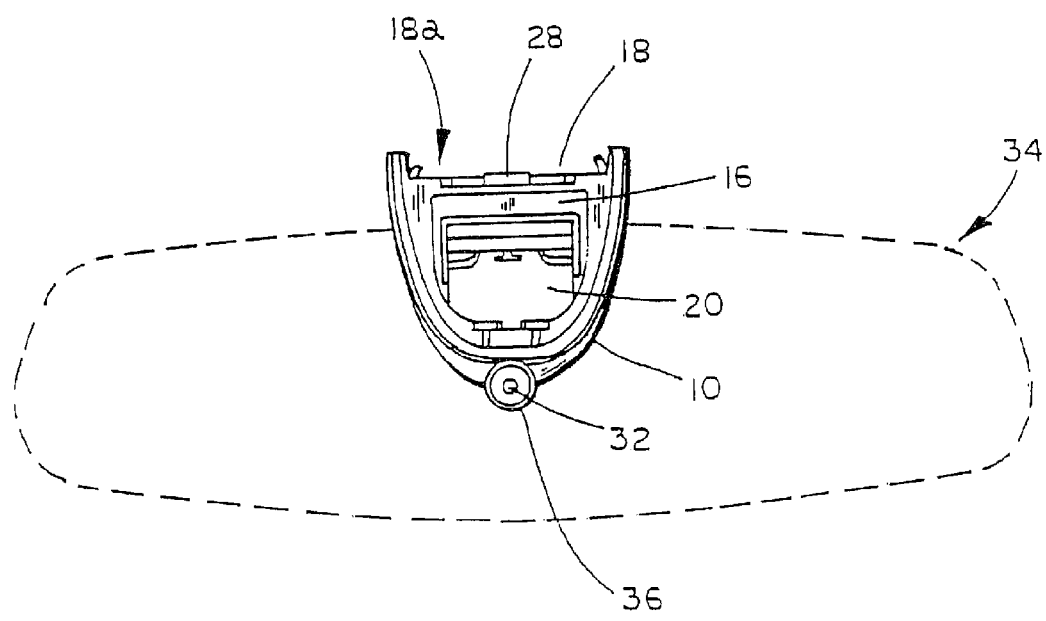
FIG. 5 is a view of the mirror assembly of FIG. 3 looking into the opening 20.
Figure 6:
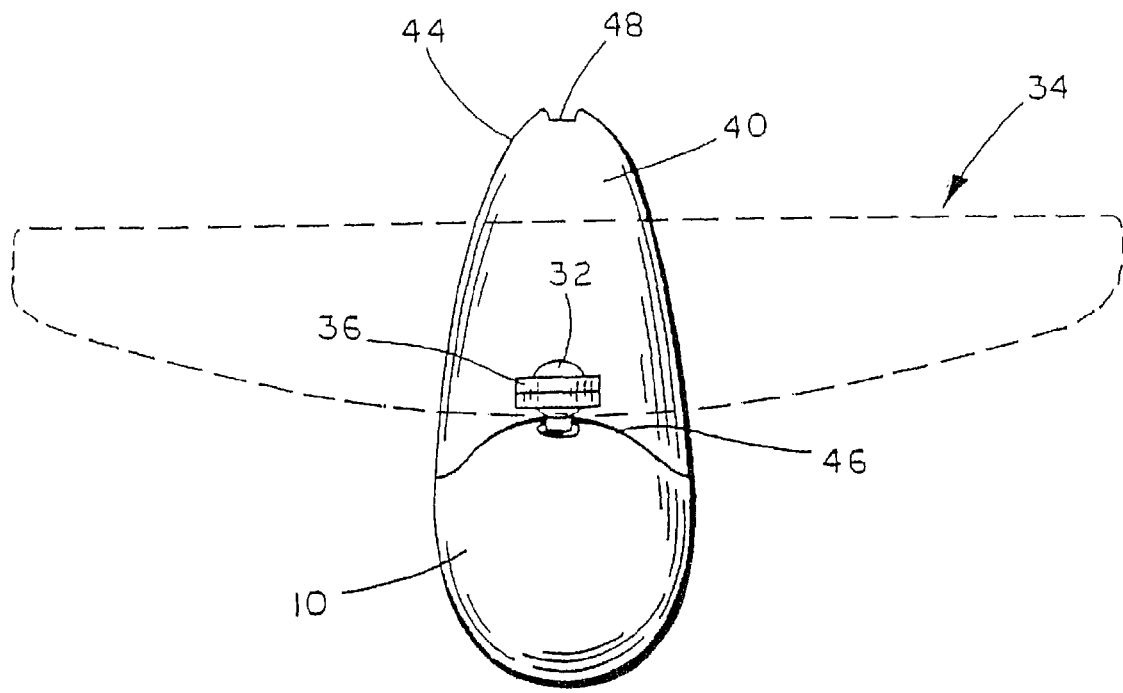
FIG. 6 is a view of the mirror assembly of FIG. 3 looking from underneath.

The cover 40 is fitted to the housing 10 by first inserting the projections 54 into a recess 60, FIGS. 2 and 5, above the opening 20a and then rotating the cover towards the windshield until the ribs 56 snap-engage the grooves 58 (the cover 40 is sufficiently resilient to permit this) and the edges 42 of the cover come to lie flat against the interior surface of the windshield 22, as seen in FIGS. 1 and 2. The cover 40 may be removed by pulling the narrow end 44 away from the windshield until the ribs 56 disengage the grooves 58 and then withdrawing the projection 54 from the recess 60.

The cover 40 serves a dual purpose. First, it protects the compartment 20a and hence the component 30 against the ingress of dust and other contaminants, yet it is easily removed to allow the component 30 to be serviced or replaced, if necessary after removing the mirror unit 34. Secondly, it provides a conduit for electrical leads 62, 64 and 66 respectively from the rain sensor 26, component 30 and (if fitted) the electro-optic or other electrically operated mirror 38.

As seen in FIG. 1, these leads are routed under the cover 40 and through the opening 48 at the rear end 44 of the cover into the vehicle header 24 where they are connected into the vehicle electrical system.

As clearly shown in FIG. 2, the ball joint 32 includes a passageway or a conduit through which can pass the electrical leads connecting to a component such as a eletrochromic mirror element 38 or compass display in the mirror head 34. In particular, there is shown a lead 68 connected to a compass display 70 which displays through the mirror element. Alternatively, the display 70 can be located at other positions in the interior rear view mirror assembly, such as in a chin portion or in an eyebrow portion.

Optionally, the removable cover includes at least one opening 100 or port through which a pointed object such as the tip of a ball point pen or a needle or the like can be inserted to activate switches on a PCB located in one of the compartments. Thus, for example, the zone and/or the calibration of a compass PCB can be adjusted without the necessity to remove the removable cover.

Figure 8:
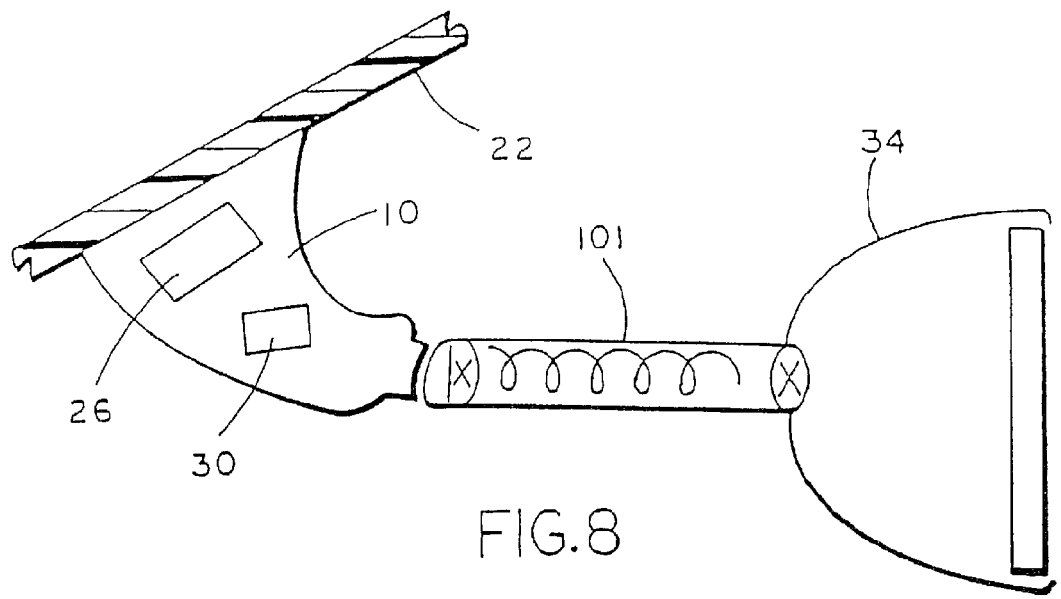
FIG. 8 is a schematic view of another embodiment of vehicle interior mirror assembly according to the invention.
Figure 9:
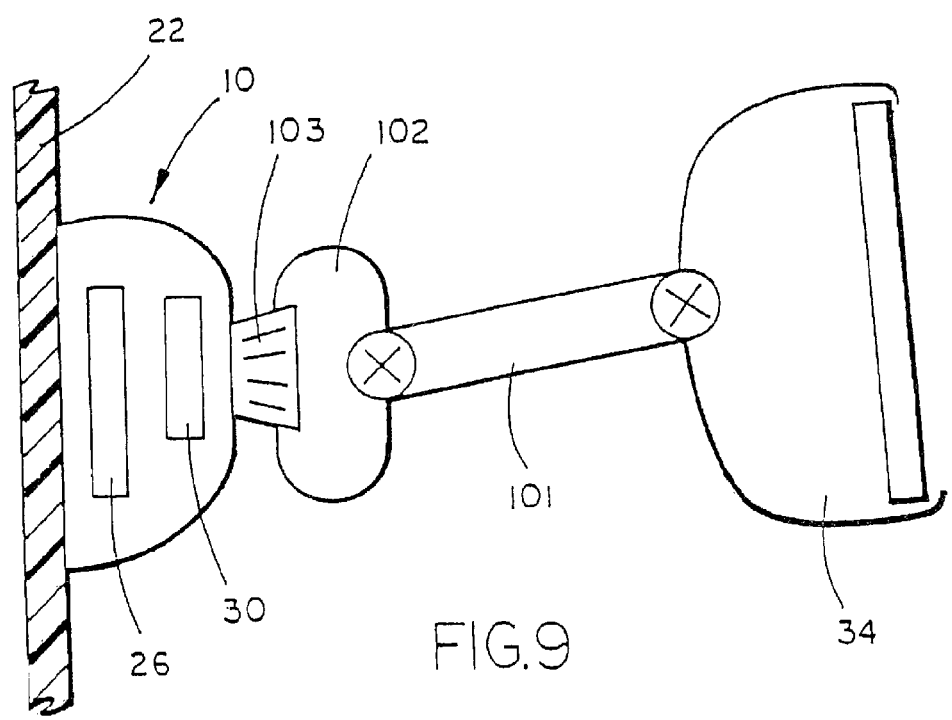
FIG. 9 is a schematic view of yet a further embodiment of a vehicle into rear mirror assembly according to the invention.

Also, a camera may be located on the assembly for example on the housing, or mirror unit or cover and arranged to look either forwardly or rearwardly in terms of the direction of motion of the vehicle, or in another desired direction. In FIGS. 8 and 9 there is shown schematic views of other embodiments of the invention. Thus, in FIG. 8 there is shown the housing 10 containing a rain sensor 26 and another electrical component for example a printed circuit board of a compass sensor 30, with the housing attached to the vehicle windshield 22. The mirror unit 34 is adjustably attached to the housing 10 by a double ball adjustable mirror support arm 101.

In FIG. 9, the mirror support arm 101 is attached to a mirror assembly mount 102. The housing 10 also comprises a mirror assembly mount button 103 which may be fixed to the housing 10 or integrally formed therewith. The mount 102 is detachably attached to the mirror assembly mount button 103.

Although the component 30 has been described as a compass sensor PCB, it can be any of a number of sensors or circuits which can be made small enough to fit in the compartment 20. Preferably, component 30 is provided as a unitary module that is received within compartment 20. Most preferably, component 30 is electrically connected with the electric/electronic wiring provided to the rear view mirror assembly. Thus, an electronic accessory can be provided as a module, can be inserted and received in the rear view mirror assembly, and can make electrical connection (such as by a plug and socket to the rear view mirror assembly). This facilitates and enables the manufacture and supply of the rear view mirror assembly, by a mirror assembly manufacturer, to a vehicle assembly line, and the separate manufacture and supply of the electrical/electronic module to that vehicle assembly line, with the automaker conveniently inserting the electric/electronic module into the compartment of the rear view mirror assembly when the rear view mirror assembly is being mounted on a vehicle passing down a vehicle assembly line.

For example, the compartment 20 may contain a sensor or sensors for vehicle altitude and/or incline, seat occupancy or air bag activation enable/disable, or (if a viewing aperture is made in the housing 10) photosensors for headlamp intensity/daylight intensity measurement. Alternatively, the compartment 20 may contain a transmitter and/or receiver, along with any associated sensors, for geographic positioning satellite (GPS) systems, pagers, cellular phone systems, ONSTAR™ wireless communication, systems, vehicle speed governors, security systems, tire monitoring systems, remote fueling systems where vehicle fueling and/or payment/charging for fuel is remotely achieved, remote keyless entry systems, garage and/or security door opener systems, INTERNET interfaces, vehicle tracking systems, remote car door unlock systems, e-mail systems, toll booth interactions systems, highway information systems, traffic warning systems, home access systems, garage door openers and the like. Of course, any of the above may be mounted under the cover 40, in addition to the component 30 in the compartment 20.

Where the component 30 is a transmitter or receiver, or where a further component mounted under the cover 40 is a transmitter or receiver, the cover 40 may include an associated antenna. The antenna may mounted as a separate item under the cover 40, or the cover itself may serve as the antenna, being either coated with a layer of conductive material or moulded from a conductive plastics material.

Also, a photosensor may be included in a compartment of the housing, preferably a skyward facing photosensor that views skyward through the vehicle windshield for the purpose of providing automatic headlamp activation/deactivation at dusk/dawn. Also, the housing may include a single microphone or a plurality of microphones for detecting vocal inputs from vehicle occupants for the purpose of cellular phone wireless communication.

Most preferably such microphones provide input to an audio system that transmits and communicates wirelessly with a remote transceiver, preferably in voice recognition mode. Such systems are described in commonly assigned, U.S. patent application Ser. No. 09/382,720, filed Aug. 25, 1999, now U.S. Pat. No. 6,243,003, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like.

Preferably the housing includes an analog to digital converter and or a digital analog converter for the purpose of converting the analog output of the microphone to a digital signal for input to a digital sound processor and for conversion of the digital output of a digital sound processor to an analog signal for wireless transmission to a remote transceiver.

The housing may include a variety of information displays such as a PSIR (Passenger Side Inflatable Restraint) display, an SIR (Side-Airbag Inflatable Restraint), compass/temperature display, a tire pressure status display or other desirable displays, such as those described in commonly assigned, U.S. patent application Ser. No. 09/244,726, filed Feb. 5, 1999, now U.S. Pat. No. 6,172,613, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. Preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different speed limits for the same stretch of highway can be set for different classes of vehicles. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior sideview mirror assembly). Also, the interior rearview mirror and/or the exterior side view mirrors can function as transceivers/display locations/interface locations for intelligent vehicle highway systems, using protocols such as the BLUETOOTH protocol. Protocols such as BLUETOOTH, as known in the telecommunications art, can facilitate voice/data, voice over data, digital and analogue communication and vehicle/external wireless connectivity, preferably using the interior and/or exterior mirror assemblies as transceiver/display/user-interaction sites. Electronic accessories to achieve the above can be accommodated in housing 10, and/or elsewhere in the interior mirror assembly (such as in the mirror housing). Examples of such electronic accessories include in-vehicle computers, personal organizers/palm computers such as the Palm Pilot™ personal display accessory (PDA), cellular phones and pagers, remote transaction interfaces/systems such as described in commonly assigned, U.S. patent application Ser. No 09/057,428, filed Apr. 8, 1998, now U.S. Pat. No. 6,158,655, the disclosure of which is hereby incorporated by reference herein, automatic toll booth payment systems, GPS systems, e-mail receivers/displays, a videophone, vehicle security systems, digital radio station transmission to the vehicle by wireless communication as an alternate to having an in-vehicle dedicated conventional radio receiver, traffic/weather broadcast to the vehicle, preferably digitally, and audio play and/or video display thereof in the vehicle, most preferably at the interior rearview mirror, highway hazard warning systems and the like.

The information display at the interior rearview mirror assembly (such as at the mirror housing or viewable in the mirror reflector) may be formed using electronic ink technology and can be reconfigurable. Examples of electronic ink technology include small plastic capsules or microcapsules, typically $\frac{1}{10}$ of a millimeter across or thereabouts, that are filled with a dark ink and that have in that ink white particles which carry a charge such as a positive charge. Electrodes place an electric field across the capsules and the electric field can attract or repel the charged particles in the capsules. If the white particle is attracted to the top of a capsule so that it is closest to a viewer, the display element/pixel appears white to the viewer. If the white particle is attracted to the bottom of the capsule (away from the viewer), the display element/pixel appears dark as the viewer now sees the dark ink in the capsule. Such displays are available from E Ink of Cambridge, Mass. Such electronic ink displays have the advantage of forming text or graphics that, once formed, do not disappear when the display powering voltage is disconnected (i.e. they have a long display memory). Alternately, GYRICON™ electronic ink technology developed by XEROX Corporation can be used. Here, microbeads are used that are black (or another dark color) on one side and white (or another light color) on the other side. The beads are dipolar in that one hemisphere carries a stronger (and hence different) charge than the opposing other hemisphere. The beads are small (about 1/10th of a millimeter diameter) and turn or flip when placed in an electric field, with the respective poles of the dipolar beads being attracted to the corresponding polarity of the applied electric field. Thus, a white pixel or a black pixel can be electrically written. Once the bead has turned or flipped, it remains turned or flipped unless an electric potential of the opposite polarity is applied. Thus, the display has memory.

Other types of information displays can be used at the interior mirror location. For example, a field-emission display such as the field-emission display available from Candescent Technologies of San Jose, Calif. can be used. Field-emission displays include a plurality of charge emitting sources or guns that bombard a phosphor screen. For example, a myriad of small or microscopic cones (<1 micron tall, for example and made of a metal such as molybdenum) are placed about a millimeter from phosphors on a screen. The cones emit electrons from their tips or apexes to bombard the phosphors under an applied electric field. This technology is adaptable to provide thin display screens (such as less than 10 mm or so). Alternately, field-emission displays can be made using carbon nanotubes which are cylindrical versions of buckminsterfullerene, and available from Motorola. Such field-emission displays are particularly useful for video displays as they have high brightness and good contrast ratio, even under high ambient lighting conditions such as in a vehicle cabin by day. Such displays can be located at the interior rearview mirror, preferably, or optionally elsewhere in the vehicle cabin such as in the dash, in the windshield header at the top interior edge of the windshield, in a seat back, or the like.

A further advantage of providing a housing 10 which accommodates multiple electrical accessories, preferably in individual compartments, is that incorporation of optional accessories into a specific vehicle is facilitated. It also facilitates supply of the housing 10 and associated mirror unit by a mirror manufacturer and supply of at least one of the electrical accessories by a second, different accessory manufacturer, and with the automaker placing the at least one electrical accessory into the housing 10 at the vehicle assembly plant, preferably at the vehicle assembly line. Thus, for example, an interior mirror assembly can be manufactured by a mirror supplier that includes housing 10, compartments 18 and 20 (or, optionally, more compartments), printed circuit board 30 (such as a compass sensor printed circuit board) in compartment 20 but with compartment 18 empty, removable cover 40, a mirror support arm articulating about housing 20, a mirror housing or case supported on said support arm, a reflector element in said mirror housing (preferably an electrochromic mirror element which includes an information display such as of compass direction and/or temperature displaying through said mirror element as is known in the mirror arts). A rain sensor module can be made by a separate manufacturer. The rain sensor module and the interior mirror assembly can be shipped to a vehicle assembly plant (or local to it). Then, when a particular vehicle requires a rains sensor module, the vehicle manufacturer can place the rain sensor module into compartment 18, connect the rain sensor module to the wire harness provided to mirror assembly (preferably, the rain sensor module docks into compartment 18 in a manner that connects it electrically to the vehicle or alternatively, the rain sensor module includes a plug or socket that connects to a corresponding socket or plug already provided in housing 10 (or elsewhere on the interior mirror assembly). This allows "plug & play" accommodation of multiple accessories into the interior rearview mirror assembly. Also, the interior rearview mirror assembly may be shipped to the assembly plant with both compartments 18 and 20 empty, thus allowing, for example, the automaker to solely place a rain sensor module into compartment 18 but add no further accessory into compartment 20.

The invention is not limited to the embodiments described herein which may be modified or varied without departing from the scope of the invention.

The invention claimed is:

1. An accessory mounting system suitable for use in a vehicle, said accessory mounting system comprising:
    an assembly adapted for mounting at and demounting from a receiving structure at a portion of an interior surface of a windshield of a vehicle;
    a light absorbing layer at said portion of the windshield of the vehicle, said light absorbing layer at least partially hiding said assembly from view by a viewer external the vehicle when said viewer is viewing through the windshield with said assembly normally mounted at said receiving structure;
    wherein said light absorbing layer includes a light transmitting portion;
    a forwardly-viewing camera disposed at said assembly;
    said forwardly-viewing camera viewing through said light transmitting portion of said light absorbing layer at said portion of the windshield of the vehicle when said assembly is mounted at said receiving structure; and
    wherein said assembly comprises a pivot element and wherein said pivot element has electrical wiring passing therethrough, said pivot element connecting to an interior mirror.

2. The accessory mounting system of claim 1, wherein said forwardly-viewing camera disposed at said assembly at least one of (a) electrically couples to an accessory located in the vehicle external to said assembly and (b) shares a component with an accessory located in the vehicle external to said assembly.

3. The accessory mounting system of claim 1, wherein said interior mirror comprises an interior electrochromic mirror.

4. The accessory mounting system of claim 1, wherein an additional accessory is disposed at said assembly, and wherein said additional accessory is selected from the group consisting of (a) a vehicle altitude sensor, (b) a vehicle incline sensor, (c) a headlamp sensor, (d) a daylight sensor, (e) a rain sensor, (f) a geographic positioning satellite (GPS) receiver, (g) an antenna, (h) a camera, (i) a microphone, (j) a compass sensor, (k) a photosensor and (l) a garage door opener.

5. The accessory mounting system of claim 1, wherein a rain sensor is disposed at said assembly.

6. The accessory mounting system of claim 5, wherein at least one of (a) said receiving structure has an aperture and said rain sensor views through said aperture of said receiving structure and (b) said receiving structure has an aperture and said rain sensor views through said aperture of said receiving structure, and wherein said rain sensor is biased at least partially through said aperture of said receiving structure and into contact with the interior surface of the windshield.

7. The accessory mounting system of claim 1, wherein at least one of (a) said light absorbing layer comprises a ceramic frit layer and (b) said light transmitting portion of said light absorbing layer comprises a light transmitting opening.

8. The accessory mounting system of claim 1, wherein said assembly includes an opening, said opening facing toward the windshield when said assembly is mounted at said receiving structure at the interior surface of the windshield of the vehicle, and wherein said opening of said assembly generally aligns with said light transmitting portion of said light absorbing layer when said assembly is mounted at said receiving structure at said portion of the windshield of the vehicle.

9. The accessory mounting system of claim 8, wherein a rain sensor is disposed at said assembly and wherein said rain sensor is in contact with the interior surface of the windshield when said assembly is mounted at said receiving structure at the interior surface of the windshield of the vehicle.

10. The accessory mounting system of claim 9, wherein said light transmitting portion of said light absorbing layer comprises a light transmitting opening, and wherein said light transmitting opening is generally disposed at a central portion of said light absorbing layer.

11. The accessory mounting system of claim 1, wherein said assembly includes a cavity and wherein an internal wall separates said cavity into first and second compartments, said forwardly-viewing camera being at said first compartment.

12. The accessory mounting system of claim 1, further comprising a removable cover for said assembly, said cover being removable from said assembly to facilitate service when said assembly is normally mounted at said receiving structure.

13. The accessory mounting system of claim 1, wherein at least one of (a) said receiving structure at the interior surface comprises an element adhesively attached to the interior surface of the windshield, (b) said receiving structure at the interior surface comprises a metallic element adhesively attached to the interior surface of the windshield, (c) said receiving structure at the interior surface comprises a generally circular mirror mounting button and (d) said receiving structure at the interior surface comprises an element adhesively attached to the interior surface of the windshield by at least one of an epoxy adhesive, a urethane adhesive, a polyvinyl butyral adhesive and a silicone adhesive.

14. The accessory mounting system of claim 1, wherein at least one of (a) said receiving structure is formed by a metal fabrication, said metal fabrication comprising at least one of casting and sintering, and (b) said receiving structure comprises a polymeric element adhesively attached to the windshield.

15. The accessory mounting system of claim 14, wherein said receiving structure is adhesively attached at said portion of the windshield and is configured to be receivable by a mirror mount of an interior rearview mirror assembly.

16. The accessory mounting system of claim 1, wherein said assembly comprises a metallic structure, and wherein said accessory mounting system further comprises a polymeric cover for said assembly.

17. The accessory mounting system of claim 16, wherein a rain sensor is encompassed by said cover when said assembly is normally mounted at said receiving structure.

18. The accessory mounting system of claim 1, wherein said interior mirror comprises an interior electrochromic mirror, said interior electrochromic mirror comprising a mirror housing including a mirror reflector, and wherein said mirror housing is adjustable about said pivot element to adjust a rearward field of view of said mirror reflector when said assembly is mounted at said receiving structure at said portion of the interior surface of the windshield of the vehicle.

19. The accessory mounting system of claim 18, wherein at least one of (a) said pivot element comprises an element of a ball and socket pivot joint, (b) said pivot element comprises an element of a ball and socket pivot joint and said element of said ball and socket pivot joint is integral with said assembly, and (c) said pivot element has a conduit established therethrough for said electrical wiring.

20. The accessory mounting system of claim 1, wherein said camera comprises a camera module that is received at said assembly as a modular unit.

21. The accessory mounting system of claim 20, wherein an electrical connection is made as said camera module is received at said assembly.

22. An accessory mounting system suitable for use in a vehicle, said accessory mounting system comprising:
   an assembly adapted for attaching at a portion of an interior surface of a windshield of a vehicle;
   a light absorbing layer at said portion of the windshield of the vehicle, said light absorbing layer at least partially hiding said assembly from view by a viewer external the vehicle when said viewer is viewing through the windshield with said assembly normally attached at said portion of the windshield;
   wherein said light absorbing layer includes a light transmitting portion;
   a forwardly-viewing camera disposed at said assembly;
   said forwardly-viewing camera viewing through said light transmitting portion of said light absorbing layer at said portion of the windshield of the vehicle when said assembly is attached at said portion of the windshield;
   wherein said assembly comprises a pivot element, said pivot element connecting to an interior mirror;
   wherein said pivot element comprises an element of a ball and socket pivot joint and said element of said ball and socket pivot joint is integral with said assembly; and
   wherein said interior mirror comprises an interior electrochromic mirror, said interior electrochromic mirror comprising a mirror housing including a mirror reflector, and wherein said mirror housing is adjustable about said pivot element to adjust a rearward field of view of said mirror reflector when said assembly is attached at said portion of the windshield of the vehicle.

23. The accessory mounting system of claim 22, wherein said pivot element has electrical wiring passing therethrough.

24. The accessory mounting system of claim 22, wherein an additional accessory is disposed at said assembly, and wherein said additional accessory is selected from the group consisting of (a) a vehicle altitude sensor, (b) a vehicle incline sensor, (c) a headlamp sensor, (d) a daylight sensor, (e) a rain sensor, (f) a geographic positioning satellite (GPS) receiver, (g) an antenna, (h) a camera, (i) a microphone, (j) a compass sensor, (k) a photosensor and (l) a garage door opener.

25. The accessory mounting system of claim 22, wherein a rain sensor is disposed at said assembly.

26. The accessory mounting system of claim 25, wherein said assembly is adapted for mounting at and demounting from a receiving structure at said portion of the interior surface of the windshield of the vehicle, and wherein at least one of (a) said receiving structure has an aperture and said rain sensor views through said aperture of said receiving structure and (b) said receiving structure has an aperture and said rain sensor views through said aperture of said receiving structure, and wherein said rain sensor is biased at least partially through said aperture of said receiving structure and into contact with the interior surface of the windshield.

27. The accessory mounting system of claim 22, further comprising a removable cover for said assembly, said cover being removable from said assembly to facilitate service when said assembly is normally attached at said portion of the windshield.

28. The accessory mounting system of claim 22, wherein said assembly comprises a metallic structure, and wherein said accessory mounting system further comprises a cover for said assembly.

29. The accessory mounting system of claim 28, wherein a rain sensor is encompassed by said cover when said assembly is attached at said portion of an interior surface of a windshield of a vehicle.

30. An accessory mounting system suitable for use in a vehicle, said accessory mounting system comprising:
an assembly adapted for attaching at a portion of an interior surface of a windshield of a vehicle;
a light absorbing layer at said portion of the windshield of the vehicle, said light absorbing layer at least partially hiding said assembly from view by a viewer external the vehicle when said viewer is viewing through the windshield with said assembly normally attached at said portion of the windshield;
wherein said light absorbing layer includes a light transmitting portion;
a forwardly-viewing camera disposed at said assembly;
said forwardly-viewing camera viewing through said light transmitting portion of said light absorbing layer at said portion of the windshield of the vehicle when said assembly is attached at said portion of the windshield; and
wherein said assembly comprises a mirror assembly mount button and wherein said mirror assembly mount button is configured to be received by a mirror mount of an interior rearview mirror assembly.

31. The accessory mounting system of claim 30, wherein said interior rearview mirror assembly comprises a single pivot support assembly for an interior mirror, said interior mirror comprising a mirror housing including a mirror reflector, and wherein said mirror housing of said interior mirror is adjustable via said single pivot support assembly to adjust a rearward field of view of said mirror reflector when said mirror mount receives said mirror assembly mount button of said assembly and when said assembly is attached at said portion of the windshield of the vehicle.

32. The accessory mounting system of claim 31, wherein said assembly adapted for attaching at said portion of the windshield is adapted for mounting at and demounting from a receiving structure adhesively attached at said portion of the windshield.

33. The accessory mounting system of claim 32, wherein said receiving structure adhesively attached at said portion of the windshield and said mirror assembly mount button are similarly configured to be receivable by a mirror mount of an interior rearview mirror assembly.

34. The accessory mounting system of claim 30, wherein said interior rearview mirror assembly comprises a double pivot support assembly for an interior mirror, said interior mirror comprising a mirror housing including a mirror reflector, and wherein said mirror housing of said interior mirror is adjustable via said double pivot support assembly to adjust a rearward field of view of said mirror reflector when said mirror mount receives said mirror assembly mount button of said assembly and when said assembly is attached at said portion of the windshield of the vehicle.

35. The accessory mounting system of claim 34, wherein said assembly adapted for attaching at said portion of the windshield is adapted for mounting at and demounting from a receiving structure adhesively attached at said portion of the windshield.

36. The accessory mounting system of claim 35, wherein said receiving structure adhesively attached at said portion of the windshield and said mirror assembly mount button are similarly configured to be receivable by a mirror mount of an interior rearview mirror assembly.

37. The accessory mounting system of claim 30, wherein said mirror assembly mount button is integral with said assembly.

38. The accessory mounting system of claim 37, wherein said assembly is adapted for mounting at and demounting from a receiving structure adhesively attached at said portion of the windshield.

39. The accessory mounting system of claim 38, wherein at least one of (a) said receiving structure comprises an annular mounting button having an aperture therethrough, and wherein a rain sensor is disposed at said assembly and views through said aperture of said annular mounting button, and (b) said receiving structure comprises an annular circular mounting button having an aperture therethrough, and wherein a rain sensor is disposed at said assembly and views through said aperture of said annular circular mounting button.

40. The accessory mounting system of claim 39, wherein said rain sensor is in contact with the interior surface of the windshield when said assembly is mounted at said receiving structure at the interior surface of the windshield of the vehicle.

41. The accessory mounting system of claim 30, wherein a rain sensor is disposed at said assembly.

42. The accessory mounting system of claim 41, wherein said assembly is adapted for mounting at and demounting from a receiving structure at said portion of the interior surface of the windshield of the vehicle, and wherein said receiving structure has an aperture and wherein said rain sensor views through said aperture of said receiving structure.

43. The accessory mounting system of claim 42, wherein at least one of (a) said receiving structure comprises an annular mounting button and (b) said receiving structure comprises an annular circular mounting button.

44. The accessory mounting system of claim 30, further comprising a removable cover for said assembly, said cover being removable from said assembly to facilitate service when said assembly is normally attached at said portion of the windshield.

45. The accessory mounting system of claim 44, wherein said light transmitting portion comprises a light transmitting opening.

46. The accessory mounting system of claim 30, wherein said assembly comprises a metallic structure, and wherein said accessory mounting system further comprises a polymeric cover for said assembly.

47. The accessory mounting system of claim 46, wherein a rain sensor is encompassed by said cover when said assembly is normally mounted at said receiving structure.

48. An accessory mounting system suitable for use in a vehicle, said accessory mounting system comprising:

an assembly adapted for mounting at and demounting from a receiving structure at a portion of an interior surface of a windshield of a vehicle;

a light absorbing layer at said portion of the windshield of the vehicle, said light absorbing layer at least partially hiding said assembly from view by a viewer external the vehicle when said viewer is viewing through the windshield with said assembly normally mounted at said receiving structure;

wherein said light absorbing layer includes a light transmitting portion;

a forwardly-viewing camera disposed at said assembly;

said forwardly-viewing camera viewing through said light transmitting portion of said light absorbing layer at said portion of the windshield of the vehicle when said assembly is mounted at said receiving structure;

wherein said assembly comprises a pivot element and wherein said pivot element has electrical wiring passing therethrough, said pivot element connecting to an interior mirror;

wherein said interior mirror comprises an interior electrochromic mirror, said interior electrochromic mirror comprising a mirror housing including a mirror reflector, and wherein said mirror housing is adjustable about said pivot element to adjust a rearward field of view of said mirror reflector when said assembly is mounted at said receiving structure at said portion of the interior surface of the windshield of the vehicle;

wherein at least one of (a) said pivot element comprises an element of a ball and socket pivot joint, (b) said pivot element comprises an element of a ball and socket pivot joint and said element of said ball and socket pivot joint is integral with said assembly, and (c) said pivot element has a conduit established therethrough for said electrical wiring;

wherein said accessory mounting system further comprises a cover for said assembly; and wherein a rain sensor is encompassed by said cover when said assembly is normally mounted at said receiving structure.

49. The accessory mounting system of claim 48, wherein at least one of (a) said receiving structure has an aperture and said rain sensor views through said aperture of said receiving structure and (b) said receiving structure has an aperture and said rain sensor views through said aperture of said receiving structure, and wherein said rain sensor is biased at least partially through said aperture of said receiving structure and into contact with the interior surface of the windshield.

50. The accessory mounting system of claim 48, wherein said cover is removable to facilitate service when said assembly is normally attached at said portion of the windshield.

51. The accessory mounting system of claim 48, wherein said receiving structure is formed by a metal fabrication, said metal fabrication comprising at least one of casting and sintering, and wherein said assembly comprises a metallic structure and wherein said light transmitting portion of said light absorbing layer comprises a light transmitting opening.

52. The accessory mounting system of claim 51, wherein said camera comprises a camera module that is received at said assembly as a modular unit and wherein said cover is removable to facilitate service when said assembly is normally attached at said portion of the windshield.

53. An accessory mounting system suitable for use in a vehicle, said accessory mounting system comprising:

an assembly adapted for mounting at and demounting from a receiving structure adhesively attached at a portion of an interior surface of a windshield of a vehicle;

a light absorbing layer at said portion of the windshield of the vehicle, said light absorbing layer at least partially hiding said assembly from view by a viewer external the vehicle when said viewer is viewing through the windshield with said assembly normally attached at said portion of the windshield;

wherein said light absorbing layer includes a light transmitting portion;

a forwardly-viewing camera disposed at said assembly;

said forwardly-viewing camera viewing through said light transmitting portion of said light absorbing layer at said portion of the windshield of the vehicle when said assembly is attached at said portion of the windshield; and wherein said assembly comprises a mirror assembly mount button and wherein said mirror assembly mount button is configured to be received by a mirror mount of an interior rearview mirror assembly.

54. The accessory mounting system of claim 53, wherein at least one of (a) said receiving structure has an aperture and said rain sensor views through said aperture of said receiving structure and (b) said receiving structure has an aperture and said rain sensor views through said aperture of said receiving structure, and wherein said rain sensor is biased at least partially through said aperture of said receiving structure and into contact with the interior surface of the windshield.

55. The accessory mounting system of claim 53, wherein said cover is removable to facilitate service when said assembly is normally mounted at said receiving structure at said portion of the windshield of the vehicle.

56. The accessory mounting system of claim 53, wherein said receiving structure is formed by a metal fabrication, said metal fabrication comprising at least one of casting and sintering, and wherein said assembly comprises a metallic structure and wherein said light transmitting portion of said light absorbing layer comprises a light transmitting opening.

57. The accessory mounting system of claim 56, wherein said camera comprises a camera module that is received at said assembly as a modular unit and wherein said cover is removable to facilitate service when said assembly is normally mounted at said receiving structure.

58. The accessory mounting system of claim 53, wherein said receiving structure adhesively attached at said portion of the windshield and said mirror assembly mount button are similarly configured to be receivable by a mirror mount of an interior rearview mirror assembly.

59. The accessory mounting system of claim 58, wherein said interior rearview mirror assembly comprises a double pivot support assembly for an interior mirror, said interior mirror comprising a mirror housing including a mirror reflector, and wherein said mirror housing of said interior mirror is adjustable via said double pivot support assembly to adjust a rearward field of view of said mirror reflector when said mirror mount receives said mirror assembly mount button of said assembly and when said assembly is mounted at said receiving structure at said portion of the windshield of the vehicle.

60. The accessory mounting system of claim 58, wherein said interior rearview mirror assembly comprises a single pivot support assembly for an interior mirror, said interior mirror comprising a mirror housing including a mirror reflector, and wherein said mirror housing of said interior mirror is adjustable via said single pivot support assembly to adjust a rearward field of view of said mirror reflector when said mirror mount receives said mirror assembly mount button of said assembly and when said assembly is mounted at said receiving structure at said portion of the windshield of the vehicle.

61. The accessory mounting system of claim 53, wherein said accessory mounting system further comprises a cover for said assembly and wherein a rain sensor is encompassed by said cover when said assembly is normally mounted at said receiving structure.

* * * * *